(12) United States Patent
Pachner et al.

(10) Patent No.: US 9,650,934 B2
(45) Date of Patent: May 16, 2017

(54) ENGINE AND AFTERTREATMENT OPTIMIZATION SYSTEM

(75) Inventors: Daniel Pachner, Prague (CZ); Jaroslav Pekar, Pacov (CZ)

(73) Assignee: Honeywell spol.s.r.o., Prague (CZ)

(*) Notice: Subject to any disclaimer, the term of this patent is extended or adjusted under 35 U.S.C. 154(b) by 842 days.

(21) Appl. No.: 13/290,012

(22) Filed: Nov. 4, 2011

(65) Prior Publication Data
US 2013/0111878 A1  May 9, 2013

(51) Int. Cl.
| | | |
|---|---|---|
| F01N 3/00 | (2006.01) | |
| F01N 3/20 | (2006.01) | |
| F02D 41/02 | (2006.01) | |
| F01N 9/00 | (2006.01) | |
| F02D 41/26 | (2006.01) | |
| F02D 41/00 | (2006.01) | |

(52) U.S. Cl.
CPC ............ *F01N 3/208* (2013.01); *F01N 9/002* (2013.01); *F02D 41/0235* (2013.01); *F02D 41/266* (2013.01); *F02D 41/0007* (2013.01); *F02D 2200/04* (2013.01); *F02D 2200/0414* (2013.01); *F02D 2200/06* (2013.01); *F02D 2200/0625* (2013.01); *F02D 2200/08* (2013.01); *Y02T 10/24* (2013.01); *Y02T 10/47* (2013.01)

(58) Field of Classification Search
CPC ...... F01N 3/208; F01N 9/002; F02D 41/0235; F02D 41/266; F02D 2200/04; F02D 2200/06; F02D 2200/08; F02D 2200/0414; F02D 2200/0625
USPC .......................................... 60/686, 272–324
See application file for complete search history.

(56) References Cited

U.S. PATENT DOCUMENTS

| | | |
|---|---|---|
| 3,744,461 A | 7/1973 | Davis |
| 4,005,578 A | 2/1977 | McInerney |
| 4,055,158 A | 10/1977 | Marsee |

(Continued)

FOREIGN PATENT DOCUMENTS

| | | |
|---|---|---|
| CN | 102063561 | 5/2011 |
| CN | 102331350 | 1/2012 |

(Continued)

OTHER PUBLICATIONS

"Model Predictive Control Toolbox Release Notes," the Mathworks, 24 pages, Oct. 2008.

(Continued)

*Primary Examiner* — Audrey K Bradley
*Assistant Examiner* — Kelsey Stanek
(74) *Attorney, Agent, or Firm* — Seager, Tufte & Wickhem, LLP (57) ABSTRACT

An approach and system for engine and aftertreatment system optimization. Emissions of an engine may be reduced by an aftertreatment mechanism. Control of the engine and the aftertreatment mechanism may be coordinated for the best overall efficiency relative to both fuel consumption and the emissions reduction. Engine and aftertreatment control may also be optimized in terms of cost function minimization. Individual efficiencies of the engine and aftertreatment mechanism are not necessarily significant by themselves. Therefore, the engine and aftertreatment mechanism should be controlled in a manner to achieve the optimality of the engine and the aftertreatment mechanism together as one entity.

18 Claims, 3 Drawing Sheets

(56) References Cited

U.S. PATENT DOCUMENTS

| | | | |
|---|---|---|---|
| 4,206,606 | A | 6/1980 | Yamada |
| 4,252,098 | A | 2/1981 | Tomczak et al. |
| 4,359,991 | A | 11/1982 | Stumpp et al. |
| 4,383,441 | A | 5/1983 | Willis et al. |
| 4,426,982 | A | 1/1984 | Lehner et al. |
| 4,438,497 | A | 3/1984 | Willis et al. |
| 4,440,140 | A | 4/1984 | Kawagoe et al. |
| 4,456,883 | A | 6/1984 | Bullis et al. |
| 4,485,794 | A | 12/1984 | Kimberley et al. |
| 4,601,270 | A | 7/1986 | Kimberley et al. |
| 4,616,308 | A | 10/1986 | Morshedi et al. |
| 4,653,449 | A | 3/1987 | Kamei et al. |
| 4,671,235 | A | 6/1987 | Hosaka |
| 4,677,559 | A | 6/1987 | Van Bruck |
| 4,735,181 | A | 4/1988 | Kaneko et al. |
| 4,947,334 | A | 8/1990 | Massey et al. |
| 4,962,570 | A | 10/1990 | Hosaka et al. |
| 5,044,337 | A | 9/1991 | Williams |
| 5,076,237 | A | 12/1991 | Hartman et al. |
| 5,089,236 | A | 2/1992 | Clerc |
| 5,094,213 | A | 3/1992 | Dudek et al. |
| 5,095,874 | A | 3/1992 | Schnaibel et al. |
| 5,108,716 | A | 4/1992 | Nishizawa |
| 5,123,397 | A | 6/1992 | Richeson |
| 5,150,289 | A | 9/1992 | Badavas |
| 5,186,081 | A | 2/1993 | Richardson et al. |
| 5,233,829 | A | 8/1993 | Komatsu |
| 5,270,935 | A | 12/1993 | Dudek et al. |
| 5,273,019 | A | 12/1993 | Matthews et al. |
| 5,282,449 | A | 2/1994 | Takahashi et al. |
| 5,293,553 | A | 3/1994 | Dudek et al. |
| 5,349,816 | A | 9/1994 | Sanbayashi et al. |
| 5,365,734 | A | 11/1994 | Takeshima |
| 5,394,322 | A | 2/1995 | Hansen |
| 5,394,331 | A | 2/1995 | Dudek et al. |
| 5,398,502 | A | 3/1995 | Watanabe |
| 5,408,406 | A | 4/1995 | Mathur et al. |
| 5,431,139 | A | 7/1995 | Grutter et al. |
| 5,452,576 | A | 9/1995 | Hamburg et al. |
| 5,477,840 | A | 12/1995 | Neumann |
| 5,560,208 | A | 10/1996 | Halimi et al. |
| 5,570,574 | A | 11/1996 | Yamashita et al. |
| 5,598,825 | A | 2/1997 | Neumann |
| 5,609,139 | A | 3/1997 | Ueda et al. |
| 5,611,198 | A | 3/1997 | Lane et al. |
| 5,682,317 | A | 10/1997 | Keeler et al. |
| 5,690,086 | A | 11/1997 | Kawano et al. |
| 5,692,478 | A | 12/1997 | Nogi et al. |
| 5,697,339 | A | 12/1997 | Esposito |
| 5,704,011 | A | 12/1997 | Hansen et al. |
| 5,740,033 | A | 4/1998 | Wassick et al. |
| 5,746,183 | A | 5/1998 | Parke et al. |
| 5,765,533 | A | 6/1998 | Nakajima |
| 5,771,867 | A | 6/1998 | Amstutz et al. |
| 5,785,030 | A | 7/1998 | Paas |
| 5,788,004 | A | 8/1998 | Friedmann et al. |
| 5,842,340 | A | 12/1998 | Bush et al. |
| 5,846,157 | A | 12/1998 | Reinke et al. |
| 5,893,092 | A | 4/1999 | Driscoll |
| 5,924,280 | A | 7/1999 | Tarabulski |
| 5,942,195 | A | 8/1999 | Lecea et al. |
| 5,964,199 | A | 10/1999 | Atago et al. |
| 5,970,075 | A | 10/1999 | Wasada |
| 5,974,788 | A | 11/1999 | Hepburn et al. |
| 5,995,895 | A | 11/1999 | Watt et al. |
| 6,029,626 | A | 2/2000 | Bruestle |
| 6,035,640 | A | 3/2000 | Kolmanovsky et al. |
| 6,048,620 | A | 4/2000 | Zhong |
| 6,048,628 | A | 4/2000 | Hillmann et al. |
| 6,055,810 | A | 5/2000 | Borland et al. |
| 6,056,781 | A | 5/2000 | Wassick et al. |
| 6,058,700 | A | 5/2000 | Yamashita et al. |
| 6,067,800 | A | 5/2000 | Kolmanovsky et al. |
| 6,076,353 | A | 6/2000 | Freudenberg et al. |
| 6,105,365 | A | 8/2000 | Deeba et al. |
| 6,122,555 | A | 9/2000 | Lu |
| 6,134,883 | A | 10/2000 | Kato et al. |
| 6,153,159 | A | 11/2000 | Engeler et al. |
| 6,161,528 | A | 12/2000 | Akao et al. |
| 6,170,259 | B1 | 1/2001 | Boegner et al. |
| 6,171,556 | B1 | 1/2001 | Burk et al. |
| 6,178,743 | B1 | 1/2001 | Hirota et al. |
| 6,178,749 | B1 | 1/2001 | Kolmanovsky et al. |
| 6,208,914 | B1 | 3/2001 | Ward et al. |
| 6,216,083 | B1 | 4/2001 | Ulyanov et al. |
| 6,233,922 | B1 | 5/2001 | Maloney |
| 6,236,956 | B1 | 5/2001 | Mantooth et al. |
| 6,237,330 | B1 | 5/2001 | Takahashi et al. |
| 6,242,873 | B1 | 6/2001 | Drozdz et al. |
| 6,263,672 | B1 | 7/2001 | Roby et al. |
| 6,273,060 | B1 | 8/2001 | Cullen |
| 6,279,551 | B1 | 8/2001 | Iwano et al. |
| 6,312,538 | B1 | 11/2001 | Latypov et al. |
| 6,314,724 | B1 | 11/2001 | Kakuyama et al. |
| 6,321,538 | B2 | 11/2001 | Hasler et al. |
| 6,327,361 | B1 | 12/2001 | Harshavardhana et al. |
| 6,338,245 | B1 | 1/2002 | Shimoda et al. |
| 6,341,487 | B1 | 1/2002 | Takahashi et al. |
| 6,347,619 | B1 | 2/2002 | Whiting et al. |
| 6,360,159 | B1 | 3/2002 | Miller et al. |
| 6,360,541 | B2 | 3/2002 | Waszkiewicz et al. |
| 6,360,732 | B1 | 3/2002 | Bailey et al. |
| 6,363,715 | B1 | 4/2002 | Bidner et al. |
| 6,363,907 | B1 | 4/2002 | Arai et al. |
| 6,379,281 | B1 | 4/2002 | Collins et al. |
| 6,389,803 | B1 | 5/2002 | Surnilla et al. |
| 6,425,371 | B2 | 7/2002 | Majima |
| 6,427,436 | B1 | 8/2002 | Allansson et al. |
| 6,431,160 | B1 | 8/2002 | Sugiyama et al. |
| 6,445,963 | B1 | 9/2002 | Blevins et al. |
| 6,446,430 | B1 | 9/2002 | Roth et al. |
| 6,453,308 | B1 | 9/2002 | Zhao et al. |
| 6,463,733 | B1 | 10/2002 | Asik et al. |
| 6,463,734 | B1 | 10/2002 | Tamura et al. |
| 6,466,893 | B1 | 10/2002 | Latwesen et al. |
| 6,470,682 | B2 | 10/2002 | Gray, Jr. |
| 6,470,862 | B2 | 10/2002 | Isobe et al. |
| 6,470,886 | B1 | 10/2002 | Jestrabek-Hart |
| 6,481,139 | B1 | 11/2002 | Weldle |
| 6,494,038 | B2 | 12/2002 | Kobayashi et al. |
| 6,502,391 | B1 | 1/2003 | Hirota et al. |
| 6,510,351 | B1 | 1/2003 | Blevins et al. |
| 6,512,974 | B2 | 1/2003 | Houston et al. |
| 6,513,495 | B1 | 2/2003 | Franke et al. |
| 6,532,433 | B2 | 3/2003 | Bharadwaj et al. |
| 6,546,329 | B2 | 4/2003 | Bellinger |
| 6,550,307 | B1 | 4/2003 | Zhang et al. |
| 6,553,754 | B2 | 4/2003 | Meyer et al. |
| 6,560,528 | B1 | 5/2003 | Gitlin et al. |
| 6,560,960 | B2 | 5/2003 | Nishimura et al. |
| 6,571,191 | B1 | 5/2003 | York et al. |
| 6,579,206 | B2 | 6/2003 | Liu et al. |
| 6,591,605 | B2 | 7/2003 | Lewis |
| 6,594,990 | B2 | 7/2003 | Kuenstler et al. |
| 6,601,387 | B2 | 8/2003 | Zurawski et al. |
| 6,612,293 | B2 | 9/2003 | Schweinzer et al. |
| 6,615,584 | B2 | 9/2003 | Ostertag |
| 6,625,978 | B1 | 9/2003 | Eriksson et al. |
| 6,629,408 | B1 | 10/2003 | Murakami et al. |
| 6,637,382 | B1 | 10/2003 | Brehob et al. |
| 6,644,017 | B2 | 11/2003 | Takahashi et al. |
| 6,647,710 | B2 | 11/2003 | Nishiyama et al. |
| 6,647,971 | B2 | 11/2003 | Vaughan et al. |
| 6,651,614 | B2 | 11/2003 | Flamig-Vetter et al. |
| 6,662,058 | B1 | 12/2003 | Sanchez |
| 6,666,198 | B2 | 12/2003 | Mitsutani |
| 6,666,410 | B2 | 12/2003 | Boelitz et al. |
| 6,671,603 | B2 | 12/2003 | Cari et al. |
| 6,672,052 | B2 | 1/2004 | Taga et al. |
| 6,672,060 | B1 | 1/2004 | Buckland et al. |
| 6,679,050 | B1 | 1/2004 | Takahashi et al. |
| 6,687,597 | B2 | 2/2004 | Sulatisky et al. |
| 6,688,283 | B2 | 2/2004 | Jaye |
| 6,694,244 | B2 | 2/2004 | Meyer et al. |

(56) References Cited

U.S. PATENT DOCUMENTS

| | | |
|---|---|---|
| 6,694,724 B2 | 2/2004 | Tanaka et al. |
| 6,705,084 B2 | 3/2004 | Allen et al. |
| 6,718,254 B2 | 4/2004 | Hashimoto et al. |
| 6,718,753 B2 | 4/2004 | Bromberg et al. |
| 6,725,208 B1 | 4/2004 | Hartman et al. |
| 6,736,120 B2 | 5/2004 | Surnilla |
| 6,738,682 B1 | 5/2004 | Pasadyn |
| 6,739,122 B2 | 5/2004 | Kitajima et al. |
| 6,742,330 B2 | 6/2004 | Genderen |
| 6,743,352 B2 | 6/2004 | Ando et al. |
| 6,748,936 B2 | 6/2004 | Kinomura et al. |
| 6,752,131 B2 | 6/2004 | Poola et al. |
| 6,752,135 B2 | 6/2004 | McLaughlin et al. |
| 6,757,579 B1 | 6/2004 | Pasadyn |
| 6,758,037 B2 | 7/2004 | Terada et al. |
| 6,760,631 B1 | 7/2004 | Berkowitz et al. |
| 6,760,657 B2 | 7/2004 | Katoh |
| 6,760,658 B2 | 7/2004 | Yasui et al. |
| 6,770,009 B2 | 8/2004 | Badillo et al. |
| 6,772,585 B2 | 8/2004 | Iihoshi et al. |
| 6,775,623 B2 | 8/2004 | Ali et al. |
| 6,779,344 B2 | 8/2004 | Hartman et al. |
| 6,779,512 B2 | 8/2004 | Mitsutani |
| 6,788,072 B2 | 9/2004 | Nagy et al. |
| 6,789,533 B1 | 9/2004 | Hashimoto et al. |
| 6,792,927 B2 | 9/2004 | Kobayashi |
| 6,804,618 B2 | 10/2004 | Junk |
| 6,814,062 B2 | 11/2004 | Esteghlal et al. |
| 6,817,171 B2 | 11/2004 | Zhu |
| 6,823,667 B2 | 11/2004 | Braun et al. |
| 6,823,675 B2 | 11/2004 | Brunell et al. |
| 6,826,903 B2 | 12/2004 | Yahata et al. |
| 6,827,060 B2 | 12/2004 | Huh |
| 6,827,061 B2 | 12/2004 | Nytomt et al. |
| 6,827,070 B2 | 12/2004 | Fehl et al. |
| 6,834,497 B2 | 12/2004 | Miyoshi et al. |
| 6,839,637 B2 | 1/2005 | Moteki et al. |
| 6,849,030 B2 | 2/2005 | Yamamoto et al. |
| 6,873,675 B2 | 3/2005 | Kurady et al. |
| 6,874,467 B2 | 4/2005 | Hunt et al. |
| 6,879,906 B2 | 4/2005 | Makki et al. |
| 6,882,929 B2 | 4/2005 | Liang et al. |
| 6,904,751 B2 | 6/2005 | Makki et al. |
| 6,911,414 B2 | 6/2005 | Kimura et al. |
| 6,915,779 B2 | 7/2005 | Sriprakash |
| 6,920,865 B2 | 7/2005 | Lyon |
| 6,923,902 B2 | 8/2005 | Ando et al. |
| 6,925,372 B2 | 8/2005 | Yasui |
| 6,925,796 B2 | 8/2005 | Nieuwstadt et al. |
| 6,928,362 B2 | 8/2005 | Meaney |
| 6,928,817 B2 | 8/2005 | Ahmad |
| 6,931,840 B2 | 8/2005 | Strayer et al. |
| 6,934,931 B2 | 8/2005 | Plumer et al. |
| 6,941,744 B2 | 9/2005 | Tanaka |
| 6,945,033 B2 | 9/2005 | Sealy et al. |
| 6,948,310 B2 | 9/2005 | Roberts, Jr. et al. |
| 6,953,024 B2 | 10/2005 | Linna et al. |
| 6,965,826 B2 | 11/2005 | Andres et al. |
| 6,968,677 B2 | 11/2005 | Tamura |
| 6,971,258 B2 | 12/2005 | Rhodes et al. |
| 6,973,382 B2 | 12/2005 | Rodriguez et al. |
| 6,978,744 B2 | 12/2005 | Yuasa et al. |
| 6,988,017 B2 | 1/2006 | Pasadyn et al. |
| 6,996,975 B2 | 2/2006 | Radhamohan et al. |
| 7,000,379 B2 | 2/2006 | Makki et al. |
| 7,013,637 B2 | 3/2006 | Yoshida |
| 7,016,779 B2 | 3/2006 | Bowyer |
| 7,028,464 B2 | 4/2006 | Rosel et al. |
| 7,039,475 B2 | 5/2006 | Sayyarrodsari et al. |
| 7,047,938 B2 | 5/2006 | Flynn et al. |
| 7,052,434 B2 | 5/2006 | Makino et al. |
| 7,055,311 B2 | 6/2006 | Beutel et al. |
| 7,059,112 B2 | 6/2006 | Bidner et al. |
| 7,063,080 B2 | 6/2006 | Kitah et al. |
| 7,067,319 B2 | 6/2006 | Wills et al. |
| 7,069,903 B2 | 7/2006 | Surnilla et al. |
| 7,082,753 B2 | 8/2006 | Dalla Betta et al. |
| 7,085,615 B2 | 8/2006 | Persson et al. |
| 7,106,866 B2 | 9/2006 | Astorino et al. |
| 7,107,978 B2 | 9/2006 | Itoyama |
| 7,111,450 B2 | 9/2006 | Surnilla |
| 7,111,455 B2 | 9/2006 | Okugawa et al. |
| 7,113,835 B2 | 9/2006 | Boyden et al. |
| 7,117,046 B2 | 10/2006 | Boyden et al. |
| 7,124,013 B2 | 10/2006 | Yasui |
| 7,149,590 B2 | 12/2006 | Martin et al. |
| 7,151,976 B2 | 12/2006 | Lin |
| 7,152,023 B2 | 12/2006 | Das |
| 7,155,334 B1 | 12/2006 | Stewart et al. |
| 7,165,393 B2 | 1/2007 | Betta et al. |
| 7,165,399 B2 | 1/2007 | Stewart |
| 7,168,239 B2 | 1/2007 | Ingram et al. |
| 7,182,075 B2 | 2/2007 | Shahed et al. |
| 7,184,845 B2 | 2/2007 | Sayyarrodsari et al. |
| 7,184,992 B1 | 2/2007 | Polyak et al. |
| 7,188,637 B2 | 3/2007 | Dreyer et al. |
| 7,194,987 B2 | 3/2007 | Mogi |
| 7,197,485 B2 | 3/2007 | Fuller |
| 7,200,988 B2 | 4/2007 | Yamashita |
| 7,204,079 B2 | 4/2007 | Audoin |
| 7,212,908 B2 | 5/2007 | Li et al. |
| 7,275,374 B2 | 10/2007 | Stewart et al. |
| 7,275,415 B2 | 10/2007 | Rhodes et al. |
| 7,281,368 B2 | 10/2007 | Miyake et al. |
| 7,292,926 B2 | 11/2007 | Schmidt et al. |
| 7,302,937 B2 | 12/2007 | Ma et al. |
| 7,321,834 B2 | 1/2008 | Chu et al. |
| 7,323,036 B2 | 1/2008 | Boyden et al. |
| 7,328,577 B2 | 2/2008 | Stewart et al. |
| 7,337,022 B2 | 2/2008 | Wojsznis et al. |
| 7,349,776 B2 | 3/2008 | Spillane et al. |
| 7,357,125 B2 | 4/2008 | Kolavennu |
| 7,375,374 B2 | 5/2008 | Chen et al. |
| 7,376,471 B2 | 5/2008 | Das et al. |
| 7,380,547 B1 | 6/2008 | Ruiz |
| 7,383,118 B2 | 6/2008 | Imai et al. |
| 7,389,773 B2 | 6/2008 | Stewart et al. |
| 7,392,129 B2 | 6/2008 | Hill et al. |
| 7,398,082 B2 | 7/2008 | Schwinke et al. |
| 7,398,149 B2 | 7/2008 | Ueno et al. |
| 7,400,967 B2 | 7/2008 | Ueno et al. |
| 7,413,583 B2 | 8/2008 | Langer et al. |
| 7,415,389 B2 | 8/2008 | Stewart et al. |
| 7,418,372 B2 | 8/2008 | Nishira et al. |
| 7,430,854 B2 | 10/2008 | Yasui et al. |
| 7,433,743 B2 | 10/2008 | Pistikopoulos et al. |
| 7,444,191 B2 | 10/2008 | Caldwell et al. |
| 7,444,193 B2 | 10/2008 | Cutler |
| 7,447,554 B2 | 11/2008 | Cutler |
| 7,467,614 B2 | 12/2008 | Stewart et al. |
| 7,469,177 B2 | 12/2008 | Samad et al. |
| 7,474,953 B2 | 1/2009 | Hulser et al. |
| 7,493,236 B1 | 2/2009 | Mock et al. |
| 7,515,975 B2 | 4/2009 | Stewart |
| 7,522,963 B2 | 4/2009 | Boyden et al. |
| 7,536,232 B2 | 5/2009 | Boyden et al. |
| 7,542,842 B2 | 6/2009 | Hill et al. |
| 7,577,483 B2 | 8/2009 | Fan et al. |
| 7,587,253 B2 | 9/2009 | Rawlings et al. |
| 7,591,135 B2 | 9/2009 | Stewart |
| 7,599,749 B2 | 10/2009 | Sayyarrodsari et al. |
| 7,599,750 B2 | 10/2009 | Piche |
| 7,603,226 B2 | 10/2009 | Henein |
| 7,627,843 B2 | 12/2009 | Dozorets et al. |
| 7,630,868 B2 | 12/2009 | Turner et al. |
| 7,634,323 B2 | 12/2009 | Vermillion et al. |
| 7,634,417 B2 | 12/2009 | Boyden et al. |
| 7,650,780 B2 | 1/2010 | Hall |
| 7,668,704 B2 | 2/2010 | Perchanok et al. |
| 7,676,318 B2 | 3/2010 | Allain |
| 7,698,004 B2 | 4/2010 | Boyden et al. |
| 7,702,519 B2 | 4/2010 | Boyden et al. |
| 7,725,199 B2 | 5/2010 | Brackney |
| 7,734,291 B2 | 6/2010 | Mazzara, Jr. |

(56) References Cited

U.S. PATENT DOCUMENTS

| | | |
|---|---|---|
| 7,743,606 B2 | 6/2010 | Havlena et al. |
| 7,748,217 B2 | 7/2010 | Muller |
| 7,752,840 B2 | 7/2010 | Stewart |
| 7,765,792 B2 | 8/2010 | Rhodes et al. |
| 7,779,680 B2 | 8/2010 | Sasaki et al. |
| 7,793,489 B2 | 9/2010 | Wang et al. |
| 7,798,938 B2 | 9/2010 | Matsubara et al. |
| 7,826,909 B2 | 11/2010 | Attarwala |
| 7,831,318 B2 | 11/2010 | Bartee et al. |
| 7,840,287 B2 | 11/2010 | Wojsznis et al. |
| 7,844,351 B2 | 11/2010 | Piche |
| 7,844,352 B2 | 11/2010 | Youzis et al. |
| 7,846,299 B2 | 12/2010 | Backstrom et al. |
| 7,850,104 B2 | 12/2010 | Havlena et al. |
| 7,856,966 B2 | 12/2010 | Saitoh |
| 7,860,586 B2 | 12/2010 | Boyden et al. |
| 7,861,518 B2 | 1/2011 | Federle |
| 7,862,771 B2 | 1/2011 | Boyden et al. |
| 7,877,239 B2 | 1/2011 | Grichnik et al. |
| 7,878,178 B2 | 2/2011 | Stewart et al. |
| 7,891,669 B2 | 2/2011 | Araujo et al. |
| 7,904,280 B2 | 3/2011 | Wood |
| 7,905,103 B2 | 3/2011 | Larsen et al. |
| 7,907,769 B2 | 3/2011 | Sammak et al. |
| 7,930,044 B2 | 4/2011 | Attarwala |
| 7,933,849 B2 | 4/2011 | Bartee et al. |
| 7,958,730 B2 | 6/2011 | Stewart |
| 7,987,145 B2 | 7/2011 | Baramov |
| 7,996,140 B2 | 8/2011 | Stewart et al. |
| 8,001,767 B2 | 8/2011 | Kakuya et al. |
| 8,019,911 B2 | 9/2011 | Dressler et al. |
| 8,025,167 B2 | 9/2011 | Schneider et al. |
| 8,032,235 B2 | 10/2011 | Sayyar-Rodsari |
| 8,046,089 B2 | 10/2011 | Renfro et al. |
| 8,060,290 B2 | 11/2011 | Stewart et al. |
| 8,078,291 B2 | 12/2011 | Pekar et al. |
| 8,109,255 B2 | 2/2012 | Stewart et al. |
| 8,121,818 B2 | 2/2012 | Gorinevsky |
| 8,145,329 B2 | 3/2012 | Pekar et al. |
| 8,209,963 B2 | 7/2012 | Kesse et al. |
| 8,229,163 B2 | 7/2012 | Coleman et al. |
| 8,281,572 B2 | 10/2012 | Chi et al. |
| 8,311,653 B2 | 11/2012 | Zhan et al. |
| 8,312,860 B2 | 11/2012 | Yun et al. |
| 8,360,040 B2 | 1/2013 | Stewart et al. |
| 8,379,267 B2 | 2/2013 | Mestha et al. |
| 8,396,644 B2 | 3/2013 | Kabashima et al. |
| 8,418,441 B2 | 4/2013 | He et al. |
| 8,453,431 B2 | 6/2013 | Wang et al. |
| 8,473,079 B2 | 6/2013 | Havlena |
| 8,478,506 B2 | 7/2013 | Grichnik et al. |
| RE44,452 E | 8/2013 | Stewart et al. |
| 8,504,175 B2 | 8/2013 | Pekar et al. |
| 8,505,278 B2* | 8/2013 | Farrell et al. ............... 60/285 |
| 8,543,170 B2 | 9/2013 | Mazzara, Jr. et al. |
| 8,543,362 B2 | 9/2013 | Germann et al. |
| 8,555,613 B2 | 10/2013 | Wang et al. |
| 8,596,045 B2 | 12/2013 | Tuomivaara et al. |
| 8,620,461 B2 | 12/2013 | Kihas |
| 8,649,961 B2 | 2/2014 | Hawkins et al. |
| 8,694,197 B2 | 4/2014 | Rajagopalan et al. |
| 8,700,291 B2 | 4/2014 | Herrmann |
| 8,751,241 B2 | 6/2014 | Oesterling et al. |
| 8,762,026 B2 | 6/2014 | Wolfe et al. |
| 8,763,377 B2 | 7/2014 | Yacoub |
| 8,813,690 B2 | 8/2014 | Kumar et al. |
| 8,892,221 B2 | 11/2014 | Kram et al. |
| 8,904,760 B2 | 12/2014 | Mital |
| 9,170,573 B2 | 10/2015 | Kihas |
| 9,253,200 B2 | 2/2016 | Schwarz et al. |
| 2002/0073693 A1* | 6/2002 | Mukaihara et al. ............ 60/277 |
| 2002/0112469 A1 | 8/2002 | Kanazawa et al. |
| 2002/0116104 A1 | 8/2002 | Kawashima et al. |
| 2003/0089102 A1 | 5/2003 | Colignon et al. |
| 2003/0150961 A1 | 8/2003 | Boelitz et al. |
| 2004/0006973 A1 | 1/2004 | Makki et al. |
| 2004/0034460 A1 | 2/2004 | Folkerts et al. |
| 2004/0086185 A1 | 5/2004 | Sun |
| 2004/0117766 A1 | 6/2004 | Mehta et al. |
| 2004/0118107 A1 | 6/2004 | Ament |
| 2004/0144082 A1 | 7/2004 | Mianzo et al. |
| 2004/0165781 A1 | 8/2004 | Sun |
| 2004/0199481 A1 | 10/2004 | Hartman et al. |
| 2004/0221889 A1 | 11/2004 | Dreyer et al. |
| 2004/0226287 A1 | 11/2004 | Edgar et al. |
| 2005/0107895 A1 | 5/2005 | Pistikopoulos et al. |
| 2005/0143952 A1 | 6/2005 | Tomoyasu et al. |
| 2005/0171667 A1 | 8/2005 | Morita |
| 2005/0187643 A1 | 8/2005 | Sayyar-Rodsari et al. |
| 2005/0193739 A1 | 9/2005 | Brunell et al. |
| 2005/0209714 A1 | 9/2005 | Rawlings et al. |
| 2005/0210868 A1 | 9/2005 | Funabashi |
| 2006/0047607 A1 | 3/2006 | Boyden et al. |
| 2006/0111881 A1 | 5/2006 | Jackson |
| 2006/0168945 A1 | 8/2006 | Samad et al. |
| 2006/0265203 A1 | 11/2006 | Jenny et al. |
| 2006/0282178 A1 | 12/2006 | Das et al. |
| 2007/0101977 A1 | 5/2007 | Stewart |
| 2007/0142936 A1 | 6/2007 | Denison et al. |
| 2007/0144149 A1 | 6/2007 | Kolavennu et al. |
| 2007/0156259 A1 | 7/2007 | Baramov et al. |
| 2007/0245714 A1* | 10/2007 | Frazier et al. ................. 60/276 |
| 2007/0275471 A1 | 11/2007 | Coward |
| 2008/0010973 A1 | 1/2008 | Gimbres |
| 2008/0071395 A1 | 3/2008 | Pachner |
| 2008/0097625 A1 | 4/2008 | Vouzis et al. |
| 2008/0103747 A1 | 5/2008 | Macharia et al. |
| 2008/0103748 A1 | 5/2008 | Axelrud et al. |
| 2008/0104003 A1 | 5/2008 | Macharia et al. |
| 2008/0109100 A1 | 5/2008 | Macharia et al. |
| 2008/0125875 A1 | 5/2008 | Stewart et al. |
| 2008/0132178 A1 | 6/2008 | Chatterjee et al. |
| 2008/0183311 A1 | 7/2008 | MacArthur et al. |
| 2008/0208778 A1 | 8/2008 | Sayyar-Rodsari et al. |
| 2008/0244449 A1 | 10/2008 | Morrison et al. |
| 2008/0264036 A1 | 10/2008 | Bellovary |
| 2009/0005889 A1 | 1/2009 | Sayyar-Rodsari |
| 2009/0008351 A1 | 1/2009 | Schneider et al. |
| 2009/0043546 A1 | 2/2009 | Srinivasan et al. |
| 2009/0087029 A1 | 4/2009 | Coleman et al. |
| 2009/0131216 A1 | 5/2009 | Matsubara et al. |
| 2009/0182518 A1 | 7/2009 | Chu et al. |
| 2009/0198350 A1 | 8/2009 | Thiele |
| 2009/0204233 A1 | 8/2009 | Zhan et al. |
| 2009/0240480 A1 | 9/2009 | Baramov |
| 2009/0254202 A1 | 10/2009 | Pekar et al. |
| 2009/0287320 A1 | 11/2009 | MacGregor et al. |
| 2009/0312998 A1 | 12/2009 | Berckmans et al. |
| 2010/0017094 A1 | 1/2010 | Stewart et al. |
| 2010/0038158 A1 | 2/2010 | Whitney et al. |
| 2010/0050607 A1 | 3/2010 | He et al. |
| 2010/0122523 A1 | 5/2010 | Vosz |
| 2010/0126481 A1 | 5/2010 | Willi et al. |
| 2010/0204808 A1 | 8/2010 | Thiele |
| 2010/0268353 A1 | 10/2010 | Crisalle et al. |
| 2010/0300069 A1 | 12/2010 | Herrmann et al. |
| 2010/0300070 A1 | 12/2010 | He et al. |
| 2010/0305719 A1 | 12/2010 | Pekar et al. |
| 2010/0319324 A1* | 12/2010 | Mital ............... 60/286 |
| 2010/0327090 A1 | 12/2010 | Havlena et al. |
| 2011/0006025 A1 | 1/2011 | Schneider et al. |
| 2011/0010073 A1 | 1/2011 | Stewart et al. |
| 2011/0029235 A1 | 2/2011 | Berry |
| 2011/0046752 A1 | 2/2011 | Piche |
| 2011/0056265 A1 | 3/2011 | Yacoub |
| 2011/0060424 A1 | 3/2011 | Havlena |
| 2011/0066308 A1 | 3/2011 | Yang et al. |
| 2011/0071653 A1 | 3/2011 | Kihas |
| 2011/0087420 A1 | 4/2011 | Stewart et al. |
| 2011/0104015 A1 | 5/2011 | Boyden et al. |
| 2011/0125293 A1 | 5/2011 | Havlena |
| 2011/0125295 A1 | 5/2011 | Bednasch et al. |
| 2011/0131017 A1 | 6/2011 | Cheng et al. |
| 2011/0167025 A1 | 7/2011 | Danai et al. |

(56) References Cited

U.S. PATENT DOCUMENTS

| | | |
|---|---|---|
| 2011/0257789 A1 | 10/2011 | Stewart et al. |
| 2011/0264353 A1 | 10/2011 | Atkinson et al. |
| 2011/0270505 A1 | 11/2011 | Chaturvedi et al. |
| 2011/0301723 A1 | 12/2011 | Pekar et al. |
| 2012/0010732 A1 | 1/2012 | Stewart et al. |
| 2012/0024089 A1 | 2/2012 | Wang et al. |
| 2012/0109620 A1 | 5/2012 | Gaikwad et al. |
| 2012/0116649 A1 | 5/2012 | Stewart et al. |
| 2013/0030554 A1 | 1/2013 | Macarthur et al. |
| 2013/0067894 A1 | 3/2013 | Stewart et al. |
| 2013/0111878 A1 | 5/2013 | Pachner et al. |
| 2013/0111905 A1 | 5/2013 | Pekar et al. |
| 2013/0131956 A1 | 5/2013 | Thibault et al. |
| 2013/0131967 A1 | 5/2013 | Yu et al. |
| 2013/0204403 A1 | 8/2013 | Zheng et al. |
| 2013/0338900 A1 | 12/2013 | Ardanese et al. |
| 2014/0032189 A1 | 1/2014 | Hehle et al. |
| 2014/0034460 A1 | 2/2014 | Chou |
| 2014/0318216 A1 | 10/2014 | Singh |
| 2014/0343713 A1 | 11/2014 | Ziegler et al. |
| 2014/0358254 A1 | 12/2014 | Chu et al. |
| 2015/0121071 A1 | 4/2015 | Schwarz et al. |
| 2015/0354877 A1 | 12/2015 | Burns et al. |

FOREIGN PATENT DOCUMENTS

| | | |
|---|---|---|
| DE | 19628796 | 10/1997 |
| DE | 10219832 | 11/2002 |
| DE | 102009016509 | 10/2010 |
| DE | 102011103346 A1 | 8/2012 |
| EP | 0301527 | 2/1989 |
| EP | 0950803 | 4/1999 |
| EP | 3877309 | 6/2000 |
| EP | 1134368 | 3/2001 |
| EP | 1180583 | 2/2002 |
| EP | 1221544 | 7/2002 |
| EP | 1225490 A2 | 7/2002 |
| EP | 1245811 | 10/2002 |
| EP | 1273337 | 1/2003 |
| EP | 1420153 A2 | 5/2004 |
| EP | 1447727 A2 | 8/2004 |
| EP | 1498791 A1 | 1/2005 |
| EP | 1425642 B1 | 11/2005 |
| EP | 1686251 | 8/2006 |
| EP | 1399784 B1 | 10/2007 |
| EP | 2107439 | 10/2009 |
| EP | 2146258 | 1/2010 |
| EP | 1794339 B1 | 7/2011 |
| EP | 1529941 | 11/2011 |
| EP | 2543845 A1 | 1/2013 |
| EP | 2551480 A1 | 1/2013 |
| EP | 2589779 A2 | 5/2013 |
| EP | 2617975 | 7/2013 |
| EP | 2267559 B1 | 1/2014 |
| EP | 2919079 A2 | 9/2015 |
| JP | 59190443 | 10/1984 |
| JP | 2010282618 | 12/2010 |
| WO | 0144629 A2 | 6/2001 |
| WO | 0232552 | 4/2002 |
| WO | 02097540 A1 | 12/2002 |
| WO | WO 02/101208 | 12/2002 |
| WO | 03023538 A2 | 3/2003 |
| WO | 03048533 | 6/2003 |
| WO | WO 03/065135 | 8/2003 |
| WO | WO 03/078816 | 9/2003 |
| WO | WO 2004/027230 | 4/2004 |
| WO | 2006021437 A1 | 3/2006 |
| WO | 2007078907 A2 | 7/2007 |
| WO | 2008033800 | 3/2008 |
| WO | 2008115911 | 9/2008 |
| WO | 2012076838 A2 | 6/2012 |
| WO | 2013119665 A1 | 8/2013 |
| WO | 2014165439 A2 | 10/2014 |
| WO | 2016053194 A1 | 4/2016 |

OTHER PUBLICATIONS

"MPC Implementation Methods for the Optimization of the Response of Control Valves to Reduce Variability," Advanced Application Note 002, Rev. A, 10 pages, 2007.

Bemporad et al., "Model Predictive Control Toolbox 3, User's Guide," Matlab Mathworks, 282 pages, 2008.

Bemporad et al., "The Explicit Linear Quadratic Regulator for Constrained Systems," Automatica, 38, pp. 3-20, 2002.

Bemporad, "Model Predictive Control Based on Linear Programming—The Explicit Solution," IEEE Transactions on Automatic Control, vol. 47, No. 12, pp. 1974-1984, Dec. 2002.

Bemporad, "Model Predictive Control Design: New Trends and Tools," Proceedings of the $45^{th}$ IEEE Conference on Decision & Control, pp. 6678-6683, Dec. 13-15, 2006.

Boom et al., "MPC for Max-Plus-Linear Systems: Closed-Loop Behavior and Tuning", Jun. 2001, Proceedings of the 2001 American Control Conference, Arlington, VA, pp. 325-300.

Borrelli et al., "An MPC/Hybrid System Approach to Traction Control," IEEE Transactions on Control Systems Technology, vol. 14, No. 3, pp. 541-553, May 2006.

Borrelli, "Discrete Time Constrained Optimal Control," A Dissertation Submitted to the Swiss Federal Institute of Technology (ETH) Zurich, Diss. ETH No. 14666, 232 pages, Oct. 9, 2002.

Bunting, "Increased Urea Dosing Could Cut SCR Truck Running Costs", http://www.automotiveworld.com/article/85897-increased-urea-dosing-could-cut-scr-truck-running-costs, Automotive World, 3 pages, Feb. 24, 2011, printed Mar. 2, 2011.

International Application Status Report for WO 2008/033800.

U.S. Appl. No. 13/236,217.

Johansen et al., "Hardware Synthesis of Explicit Model Predictive Controllers," IEEE Transactions on Control Systems Technology, vol. 15, No. 1, Jan. 2007.

Keulen et al., "Predictive Cruise Control in Hybrid Electric Vehicles", May 2009, World Electric Journal, vol. 3, ISSN 2032-6653.

Maciejowski, "Predictive Control with Constraints," Prentice Hall, Pearson Education Limited, 4 pages, 2002.

Mariethoz et al., "Sensorless Explicit Model Predictive Control of the DC-DC Buck Converter with Inductor Current Limitation," IEEE Applied Power Electronics Conference and Exposition, pp. 1710-1715, 2008.

Marjanovic, "Towards a Simplified Infinite Horizon Model Predictive Controller," 6 pages, Proceedings of the $5^{th}$ Asian Control Conference, 6 pages, Jul. 20-23, 2004.

Mayne et al., "Constrained Model Predictive Control: Stability and Optimality," Automatica, vol. 36, pp. 789-814, 2000.

Ortner et al., "MPC for a Diesel Engine Air Path Using an Explicit Approach for Constraint Systems," Proceedings of the 2006 IEEE Conference on Control Applications, Munich Germany, pp. 2760-2765, Oct. 4-6, 2006.

Ortner et al., "Predictive Control of a Diesel Engine Air Path," IEEE Transactions on Control Systems Technology, vol. 15, No. 3, pp. 449-456, May 2007.

Pannocchia et al., "Combined Design of Disturbance Model and Observer for Offset-Free Model Predictive Control," IEEE Transactions on Automatic Control, vol. 52, No. 6, 6 pages, 2007.

Qin et al., "A Survey of Industrial Model Predictive Control Technology," Control Engineering Practice, 11, pp. 733-764, 2003.

Rawlings, "Tutorial Overview of Model Predictive Control," IEEE Control Systems Magazine, pp. 38-52, Jun. 2000.

Schauffele et al., "Automotive Software Engineering Principles, Processes, Methods, and Tools," SAE International, 10 pages, 2005.

Schutter et al., "Model Predictive Control for Max-Min-Plus-Scaling Systems", Jun. 2001, Proceedings of the 2001 American Control Conference, Arlington, VA, pp. 319-324.

Stewart et al., "A Model Predictive Control Framework for Industrial Turbodiesel Engine Control," Proceedings of the $47^{th}$ IEEE Conference on Decision and Control, 8 pages, 2008.

Stewart et al., "A Modular Model Predictive Controller for Turbodiesel Problems," First Workshop on Automotive Model (56) References Cited

OTHER PUBLICATIONS

Predictive Control, Schloss Muhldorf, Feldkirchen, Johannes Kepler University, Linz, 3 pages, 2009.
Tondel et al., "An Algorithm for Multi-Parametric Quadratic Programming and Explicit MPC Solutions," Automatica, 39, pp. 489-497, 2003.
"Model Predictive Control," Wikipedia, pp. 1-5, Jan. 22, 2009. http://en.wikipedia.org/w/index.php?title=Special:Book &bookcmd=download&collecton_id=641cd1b5da77cc22 &writer=rl&return_to=Model predictive control, retrieved Nov. 20, 2012.
Axehill et al., "A Dual Gradiant Projection Quadratic Programming Algorithm Tailored for Model Predictive Control," Proceedings of the 47th IEEE Conference on Decision and Control, Cancun Mexico, pp. 3057-3064, Dec. 9-11, 2008.
Axehill et al., "A Dual Gradient Projection Quadratic Programming Algorithm Tailored for Mixed Integer Predictive Control," Technical Report from Linkopings Universitet, Report No. Li-Th-ISY-R-2833, 58 pages, Jan. 31, 2008.
Baffi et al., "Non-Linear Model Based Predictive Control Through Dynamic Non-Linear Partial Least Squares," Trans IChemE, vol. 80, Part A, pp. 75-86, Jan. 2002.
Search Report for Corresponding EP Application No. 11167549.2 dated Nov. 27, 2012.
De Oliveira, "Constraint Handling and Stability Properties of Model Predictive Control," Carnegie Institute of Technology, Department of Chemical Engineering, Paper 197, 64 pages, Jan. 1, 1993.
Dunbar, "Model Predictive Control: Extension to Coordinated Multi-Vehicle Formations and Real-Time Implementation," CDS Technical Report 01-016, 64 pages, Dec. 7, 2001.
Patrinos et al., "A Global Piecewise Smooth Newton Method for Fast Large-Scale Model Predictive Control," Tech Report TR2010-02, National Technical University of Athens, 23 pages, 2010.
Rajamani, "Data-based Techniques to Improve State Estimation in Model Predictive Control," Ph.D. Dissertation, 257 pages, 2007.
Takacs et al., "Newton-Raphson Based Efficient Model Predictive Control Applied on Active Vibrating Structures," Proceeding of the European Control Conference 2009, Budapest, Hungary, pp. 2845-2850, Aug. 23-26, 2009.
Wright, "Applying New Optimization Algorithms to Model Predictive Control," 5th International Conference on Chemical Process Control, 10 pages, 1997.
"SCR, 400-csi Coated Catalyst," Leading NOx Control Technologies Status Summary, 1 page prior to Feb. 2, 2005.
Advanced Petroleum-Based Fuels-Diesel Emissions Control (APBF-DEC) Project, "Quarterly Update," No. 7, 6 pages, Fall 2002.
Allanson, et al., "Optimizing the Low Temperature Performance and Regeneration Efficiency of the Continuously Regenerating Diesel Particulate Filter System," SAE Paper No. 2002-01-0428, 8 pages, Mar. 2002.
Amstuz, et al., "EGO Sensor Based Robust Output Control of EGR in Diesel Engines," IEEE TCST, vol. 3, No. 1, 12 pages, Mar. 1995.
Bemporad, et al., "Explicit Model Predictive Control," 1 page, prior to Feb. 2, 2005.
Bertsekas, "On the Goldstein-Levitin-Polyak Gradient Projection Method," IEEE Transactions on Automatic Control, vol. AC-21, No. 2, pp. 174-184, Apr. 1976.
Bertsekas, "Projected Newton Methods for Optimization Problems with Simple Constraints," SIAM J. Control and Optimization, vol. 20, No. 2, pp. 221-246, Mar. 1982.
Borrelli, "Constrained Optimal Control of Linear and Hybrid Systems," Lecture Notes in Control and Information Sciences, vol. 290, 2003.
Catalytica Energy Systems, "Innovative NOx Reduction Solutions for Diesel Engines," 13 pages, 3rd Quarter, 2003.
Chatterjee, et al. "Catalytic Emission Control for Heavy Duty Diesel Engines," JM, 46 pages, prior to Feb. 2, 2005.
U.S. Appl. No. 13/353,178, filed Jan. 18, 2012.

De Schutter et al., "Model Predictive Control for Max-Min-Plus-Scaling Systems," Proceedings of the 2001 American Control Conference, Arlington, Va, pp. 319-324, Jun. 2001.
Delphi, Delphi Diesel NOx Trap (DNT), 3 pages, Feb. 2004.
Diehl et al., "Efficient Numerical Methods for Nonlinear MPC and Moving Horizon Estimation," Int. Workshop on Assessment and Future Directions of NMPC, 24 pages, Pavia, Italy, Sep. 5-9, 2008.
Guerreiro et al., "Trajectory Tracking Nonlinear Model Predictive Control for Autonomous Surface Craft," Proceedings of the European Control Conference, Budapest, Hungary, 6 pages, Aug. 2009.
Guzzella, et al., "Control of Diesel Engines," IEEE Control Systems Magazine, pp. 53-71, Oct. 1998.
Havelena, "Componentized Architecture for Advanced Process Management," Honeywell International, 42 pages, 2004.
Hiranuma, et al., "Development of DPF System for Commercial Vehicle—Basic Characteristic and Active Regeneration Performance," SAE Paper No. 2003-01-3182, Mar. 2003.
Honeywell, "Profit Optimizer a Distributed Quadratic Program (DQP) Concepts Reference," 48 pages, prior to Feb. 2, 2005.
http://www.not2fast.wryday.com/turbo/glossary/turbo_glossary.shtml, "Not2Fast: Turbo Glossary," 22 pages, printed Oct. 1, 2004.
http://www.tai-cwv.com/sbl106.0.html, "Technical Overview—Advanced Control Solutions," 6 pages, printed Sep. 9, 2004.
Jonsson, "Fuel Optimized Predictive Following in Low Speed Conditions," Master's Thesis, 46 pages, Jun. 28, 2003.
Kelly, et al., "Reducing Soot Emissions from Diesel Engines Using One Atmosphere Uniform Glow Discharge Plasma," SAE Paper No. 2003-01-1183, Mar. 2003.
Kolmanovsky, et al., "Issues in Modeling and Control of Intake Flow in Variable Geometry Turbocharged Engines", 18th IFIP Conf. System Modeling and Optimization, pp. 436-445, Jul. 1997.
Kulhavy, et al. "Emerging Technologies for Enterprise Optimization in the Process Industries," Honeywell, 12 pages, Dec. 2000.
Locker, et al., "Diesel Particulate Filter Operational Characterization," Corning Incorporated, 10 pages, prior to Feb. 2, 2005.
Lu, "Challenging Control Problems and Engineering Technologies in Enterprise Optimization," Honeywell Hi-Spec Solutions, 30 pages, Jun. 4-6, 2001.
Mehta, "The Application of Model Predictive Control to Active Automotive Suspensions," 56 pages, May 17, 1996.
Moore, "Living with Cooled-EGR Engines," Prevention Illustrated, 3 pages, Oct. 3, 2004.
Murayama et al., "Speed Control of Vehicles with Variable Valve Lift Engine by Nonlinear MPC," ICROS-SICE International Joint Conference, pp. 4128-4133, 2009.
Salvat, et al., "Passenger Car Serial Application of a Particulate Filter System on a Common Rail Direct Injection Engine," SAE Paper No. 2000-01-0473, 14 pages, Feb. 2000.
Shamma, et al. "Approximate Set-Valued Observers for Nonlinear Systems," IEEE Transactions on Automatic Control, vol. 42, No. 5, May 1997.
Soltis, "Current Status of NOx Sensor Development," Workshop on Sensor Needs and Requirements for PEM Fuel Cell Systems and Direct-Injection Engines, 9 pages, Jan. 25-26, 2000.
Stefanopoulou, et al., "Control of Variable Geometry Turbocharged Diesel Engines for Reduced Emissions," IEEE Transactions on Control Systems Technology, vol. 8, No. 4, pp. 733-745, Jul. 2000.
Storset, et al., "Air Charge Estimation for Turbocharged Diesel Engines," vol. 1 Proceedings of the American Control Conference, 8 pages, Jun. 28-30, 2000.
The MathWorks, "Model-Based Calibration Toolbox 2.1 Calibrate complex powertrain systems," 4 pages, prior to Feb. 2, 2005.
The MathWorks, "Model-Based Calibration Toolbox 2.1.2," 2 pages, prior to Feb. 2, 2005.
Theiss, "Advanced Reciprocating Engine System (ARES) Activities at the Oak Ridge National Lab (ORNL), Oak Ridge National Laboratory," U.S. Department of Energy, 13 pages, Apr. 14, 2004.
Van Basshuysen et al., "Lexikon Motorentechnik," (Dictionary of Automotive Technology) published by Vieweg Verlag, Wiesbaden 039936, p. 518, 2004. (English Translation).
Van Den Boom et al., "MPC for Max-Plus-Linear Systems: Closed-Loop Behavior and Tuning," Proceedings of the 2001 American Control Conference, Arlington, Va, pp. 325-330, Jun. 2001.

(56) References Cited

OTHER PUBLICATIONS

Van Keulen et al., "Predictive Cruise Control in Hybrid Electric Vehicles," World Electric Vehicle Journal vol. 3, ISSN 2032-6653, pp. 1-11, 2009.
Wang et al., "Fast Model Predictive Control Using Online Optimization," Proceedings of the 17$^{th}$ World Congress, the International Federation of Automatic Control, Seoul, Korea, pp. 6974-6979, Jul. 6-11, 2008.
Wang et al., "PSO-Based Model Predictive Control for Nonlinear Processes," Advances in Natural Computation, Lecture Notes in Computer Science, vol. 3611/2005, 8 pages, 2005.
Zavala et al., "The Advance-Step NMPC Controller: Optimality, Stability, and Robustness," Automatica, vol. 45, pp. 86-93, 2009.
Zeilinger et al., "Real-Time MPC—Stability Through Robust MPC Design," Joint 48$^{th}$ IEEE Conference on Decision and Control and 28$^{th}$ Chinese Control Conference, Shanghai, P.R. China, pp. 3980-3986, Dec. 16-18, 2009.
Zelenka, et al., "An Active Regeneration as a Key Element for Safe Particulate Trap Use," SAE Paper No. 2001-0103199, 13 pages, Feb. 2001.
Zhu, "Constrained Nonlinear Model Predictive Control for Vehicle Regulation," Dissertation, Graduate School of the Ohio State University, 125 pages, 2008.
European Search Report for EP Application No. 12191156.4-1603 dated Feb. 9, 2015.
European Search Report for EP Application No. EP 10175270.7-2302419 dated Jan. 16, 2013.
European Search Report for EP Application No. EP 15152957.5-1807 dated Feb. 10, 2015.
U.S. Appl. No. 15/005,406, filed Jan. 25, 2016.
U.S. Appl. No. 15/011,445, filed Jan. 29, 2016.
Khair et al., "Emission Formation in Diesel Engines," Downloaded from https://www.dieselnet.com/tech/diesel_emiform.php, 33 pages, printed Oct. 14, 2016.
Kihas et al., "Chapter 14, Diesel Engine SCR Systems: Modeling Measurements and Control," Catalytic Reduction Technology (book), Part 1, Chapter 14, prior to Jan. 29, 2016.
Krause et al., "Effect of Inlet Air Humidity and Temperature on Diesel Exhaust Emissions," SAE International Automotive Engineering Congress, 8 pages, Jan. 8-12, 1973.
Lavoie et al., "Experimental and Theoretical Study of Nitric Oxide Formation in Internal Combustion Engines," Combustion Science and Technology, vol. 1, pp. 313-326, 1970.
Manchur et al., "Time Resolution Effects on Accuracy of Real-Time NOx Emissions Measurements," SAE Technical Paper Series 2005-01-0674, 2005 SAE World Congress, 19 pages, Apr. 11-14, 2005.
Mohammadpour et al., "A Survey on Diagnostics Methods for Automotive Engines," 2011 American Control Conference, pp. 985-990, Jun. 29-Jul. 1, 2011.
Moos, "Catalysts as Sensors—A Promising Novel Approach in Automotive Exhaust Gas Aftertreatment," http://www.mdpi.com/1424-8220/10/7/6773htm, 10 pages, Jul. 13, 2010.
National Renewable Energy Laboratory (NREL), "Diesel Emissions Control—Sulfur Effects Project (DECSE) Summary of Reports," U.S. Department of Energy, 19 pages, Feb. 2002.
Payri et al., "Diesel NOx Modeling with a Reduction Mechanism for the Initial NOx Coming from EGR or Re-Entrained Burned Gases," 2008 World Congress, SAE Technical Paper Series 2008-01-1188, 13 pages, Apr. 14-17, 2008.
Payri et al., "Methodology for Design and Calibration of a Drift Compensation Method for Fuel-to-Air Ratio," SAE International 2012-01-0717, 13 pages, Apr. 16, 2012.
Pipho et al., "NO2 Formation in a Diesel Engine," SAE Technical Paper Series 910231, International Congress and Exposition, 15 pages, Feb. 25-Mar. 1, 1991.
Querel et al., "Control of an SCR System Using a Virtual NOx Sensor," 7th IFAC Symposium on Advances in Automotive Control, The International Federation of Automotive Control, pp. 9-14, Sep. 4-7, 2013.
Ricardo Software, "Powertrain Design at Your Fingertips," retrieved from http://www.ricardo.com/PageFiles/864/WaveFlyerA4_4PP.pdf, 2 pages, downloaded Jul. 27, 2015.
Santin et al., "Combined Gradient/Newton Projection Semi-Explicit QP Solver for Problems with Bound Constraints," 2 pages, prior to Jan. 29, 2016.
Schilling et al., "A Real-Time Model for the Prediction of the NOx Emissions in DI Diesel Engines," Proceedings of the 2006 IEEE International Conference on Control Applications, pp. 2042-2047, Oct. 4-7, 2006.
Schilling, "Model-Based Detection and Isolation of Faults in the Air and Fuel Paths of Common-Rail DI Diesel Engines Equipped with a Lambda and a Nitrogen Oxides Sensor," Doctor of Sciences Dissertation, 210 pages, 2008.
Shahzad et al., "Preconditioners for Inexact Interior Point Methods for Predictive Control," 2010 American Control Conference, pp. 5714-5719, Jun. 30-Jul. 2010.
Signer et al., "European Programme on Emissions, Fuels and Engine Technologies (EPEFE)—Heavy Duty Diesel Study," International Spring Fuels and Lubricants Meeting, SAE 961074, May 6-8, 1996.
Smith, "Demonstration of a Fast Response On-Board NOx Sensor for Heavy-Duty Diesel Vehicles," Technical report, Southwest Research Institute Engine and Vehicle Research Division SwRI Project No. 03-02256 Contract No. 98-302, 2000.
Stradling et al., "The Influene of Fuel Properties and Injection Timing on the Exhaust Emissions and Fuel Consumption of an Iveco Heavy-Duty Diesel Engine," International Spring Fuels and Lubricants Meeting, SAE 971635, May 5-8, 1997.
Traver et al., "A Neural Network-Based Virtual NOx Sensor for Diesel Engines," 7 pages, prior to Jan. 29, 2016.
Tschanz et al., "Cascaded Multivariable Control of the Combustion in Diesel Engines," The International Federation of Automatic Control (IFAC), 2012 Workshop on Engine and Powertrain Control, Simulation and Modeling, pp. 25-32, Oct. 23-25, 2012.
Tschanz et al., "Control of Diesel Engines Using NOx-Emission Feedback," International Journal of Engine Research, vol. 14, No. 1, pp. 45-56, 2013.
Tschanz et al., "Feedback Control of Particulate Matter and Nitrogen Oxide Emissions in Diesel Engines," Control Engineering Practice, vol. 21, pp. 1809-1820, 2013.
Turner, "Automotive Sensors, Sensor Technology Series," Momentum Press, Unable to Obtain the Entire Book, the Front and Back Covers and Table of Contents are Provided, 2009.
Van Heiden et al., "Optimization of Urea SCR deNOx Systems for HD Diesel Engines," SAE International 2004-01-0154, 13 pages, 2004.
VDO, "UniNOx-Sensor Specification," Continental Trading GmbH, 2 pages, Aug. 2007.
Vereschaga et al., "Piecewise Affine Modeling of NOx Emission Produced by a Diesel Engine," 2013 European Control Conference (ECC), pp. 2000-2005, Jul. 17-19, 2013.
Wahlstrom et al., "Modelling Diesel Engines with a Variable-Geometry Turbocharger and Exhaust Gas Recirculation by Optimization of Model Parameters for Capturing Non-Linear System Dynamics," (Original Publication) Proceedings of the Institution of Mechanical Engineers, Part D, Journal of Automobile Engineering, vol. 225, No. 7, 28 pages, 2011.
Wang et al., "Sensing Exhaust NO2 Emissions Using the Mixed Potential Principal," SAE 2014-01-1487, 7 pages, Apr. 1, 2014.
Wilhelmsson et al., "A Fast Physical NOx Model Implemented on an Embedded System," Proceedings of the IFAC Workshop on Engine and Powertrain Control, Simulation and Modeling, pp. 207-215, Nov. 30-Dec. 2, 2009.
Wilhemsson et al., "A Physical Two-Zone NOx Model Intended for Embedded Implementation," SAE 2009-01-1509, 11 pages, 2009.
Winkler et al., "Incorporating Physical Knowledge About the Formation of Nitric Oxides into Evolutionary System Identification,"Proceedings of the 20th European Modeling and Simulation Symposium (EMSS), 6 pages, 2008.
Winkler et al., "On-Line Modeling Based on Genetic Programming," 12 pages, International Journal on Intelligent Systems Technologies and Applications 2, 2007.

(56) References Cited

OTHER PUBLICATIONS

Winkler et al., "Using Genetic Programming in Nonlinear Model Identification," 99 pages, prior to Jan. 29, 2016.
Winkler et al., "Virtual Sensors for Emissions of a Diesel Engine Produced by Evolutionary System Identification," LNCS, vol. 5717, 8 pages, 2009.
Winkler, "Evolutionary System Identification—Modern Approaches and Practical Applications," Kepler Universitat Linz, Reihe C: Technik and Naturwissenschaften, Universitatsverlag Rudolf Trauner, 2009.
Wong, "CARB Heavy-Duty OBD Update," California Air Resources Board, SAE OBD TOPTEC, Downloaded from http://www.arb.ca.gov/msprog/obdprog/hdobdreg.htm, 72 pages, Sep. 15, 2005.
Yao et al., "The Use of Tunnel Concentration Profile Data to Determine the Ratio of NO2/NOx Directly Emitted from Vehicles," HAL Archives, 19 pages, 2005.
Zaman, "Lincoln Motor Company: Case study 2015 Lincoln MKC," Automotive Electronic Design Fundamentals, Chapter 6, 2015.
Zeldovich, "The Oxidation of Nitrogen in Combustion and Explosions," ACTA Physiochimica U.R.S.S., vol. XX1, No. 4, 53 pages, 1946.
Zhuiykov et al., "Development of Zirconia-Based Potentiometric NOx Sensors for Automotive and Energy Industries in the Early 21st Century: What Are the Prospects for Sensors?", Sensors and Actuators B, vol. 121, pp. 639-651, 2007.
"Aftertreatment Modeling of RCCI Engine During Transient Operation," University of Wisconsin—Engine Research Center, 1 page, May 31, 2014.
"Chapter 14: Pollutant Formation," Fluent Manual, Release 15.0, Chapter 14, pp. 313-345, prior to Jan. 29, 2016.
"Chapter 21, Modeling Pollutant Formation," Fluent Manual, Release 12.0, Chapter 21, pp. 21-1-21-54, Jan. 30, 2009.
"J1979 E/E Diagnostic Test Modules," Proposed Regulation, Vehicle E.E. System Diagnostic Standards Committee, 1 page, Sep. 28, 2010.
"MicroZed Zynq Evaluation and Development and System on Module, Hardware User Guide," Avnet Electronics Marketing, Version 1.6, Jan. 22, 2015.
Actron, "Elite AutoScanner Kit—Enhanced OBD I & II Scan Tool, OBD 1300," Downloaded from https://actron.com/content/elite-autoscanner-kit-enhanced-obd-i-and-obd-ii-scan-tool?utm_. . . , 5 pages, printed Sep. 27, 2016.
Andersson et al., "A Predictive Real Time NOx Model for Conventional and Partially Premixed Diesel Combustion," SAE International 2006-01-3329, 10 pages, 2006.
Andersson et al., "A Real Time NOx Model for Conventional and Partially Premixed Diesel Combustion," SAE Technical Paper Series 2006-01-0195, 2006 SAE World Congress, 13 pages, Apr. 3-6, 2006.
Andersson et al., "Fast Physical NOx Prediction in Diesel Engines, The Diesel Engine: The Low CO2 and Emissions Reduction Challenge," Conference Proceedings, Lyon, 2006.
Arregle et al., "On Board NOx Prediction in Diesel Engines: A Physical Approach," Automotive Model Predictive control, Models Methods and Applications, Chapter 2, 14 pages, 2010.
Asprion, "Optimal Control of Diesel Engines," PHD Thesis, Diss ETH No. 21593, 436 pages, 2013.
Assanis et al., "A Predictive Ignition Delay Correlation Under Steady-State and Transient Operation of a Direct Injection Diesel Engine," ASME, Journal of Engineering for Gas Turbines and Power, vol. 125, pp. 450-457, Apr. 2003.
Bako et al., "A Recursive Identification Algorithm for Switched Linear/Affine Models," Nonlinear Analysis: Hybrid Systems, vol. 5, pp. 242-253, 2011.
Barba et al., "A Phenomenological Combustion Model for Heat Release Rate Prediction in High-Speed DI Diesel Engines with Common Rail Injection," SAE Technical Paper Series 2000-01-2933, International Fall Fuels and Lubricants Meeting Exposition, 15 pages, Oct. 16-19, 2000.
Blanco-Rodriguez, "Modelling and Observation of Exhaust Gas Concentrations for Diesel Engine Control," Phd Dissertation, 242 pages, Sep. 2013.
Blue Streak Electronics Inc., "Ford Modules," 1 page, May 12, 2010.
Boum et al., "Advanced Compressor Engine Controls to Enhance Operation, Reliability and Integrity," Southwest Research Institute, DOE Award No. DE-FC26-03NT41859, SwRI Project No. 03.10198, 60 pages, Mar. 2004.
Charalampidis et al., "Computationally Efficient Kalman Filtering for a Class of Nonlinear Systems," IEEE Transactions on Automatic Control, vol. 56, No. 3, pp. 483-491, Mar. 2011.
Chew, "Sensor Validation Scheme with Virtual NOx Sensing for Heavy Duty Diesel Engines," Master's Thesis, 144 pages, 2007.
Extended European Search Report for EP Application No. 15155295.7-1606, dated Aug. 4, 2015.
Extended European Search Report for EP Application No. 15179435.1, dated Apr. 1, 2016.
Desantes et al., "Development of NOx Fast Estimate Using NOx Sensor," EAEC 2011 Congress, 2011.
Ding, "Characterising Combustion in Diesel Engines, Using Parameterised Finite Stage Cylinder Process Models," 281 pages, Dec. 21, 2011.
Docquier et al., "Combustion Control and Sensors: a Review," Progress in Energy and Combustion Science, vol. 28, pp. 107-150, 2002.
Egnell, "Combustion Diagnostics by Means of Multizone Heat Release Analysis and NO Calculation," SAE Technical Paper Series 981424, International Spring Fuels and Lubricants Meeting and Exposition, 22 pages, May 4-6, 1998.
Ericson, "NOx Modelling of a Complete Diesel Engine/SCR System," Licentiate Thesis, 57 pages, 2007.
Finesso et al., "Estimation of the Engine-Out NO2/NOx Ration in a Euro VI Diesel Engine," SAE International 2013-01-0317, 15 pages, Apr. 8, 2013.
Fleming, "Overview of Automotive Sensors," IEEE Sensors Journal, vol. 1, No. 4, pp. 296-308, Dec. 2001.
Ford Motor Company, "2012 My OBD System Operation Summary for 6.7L Diesel Engines," 149 pages, Apr. 21, 2011.
Formentin et al., "NOx Estimation in Diesel Engines Via In-Cylinder Pressure Measurement," IEEE Transactions on Control Systems Technology, vol. 22, No. 1, pp. 396-403, Jan. 2014.
Galindo, "An On-Engine Method for Dynamic Characterisation of NOx Concentration Sensors," Experimental Thermal and Fluid Science, vol. 35, pp. 470-476, 2011.
GM "Advanced Diesel Technology and Emissions," powertrain technologies—engines, 2 pages, prior to Feb. 2, 2005.
Goodwin, "Researchers Hack A Corvette's Brakes Via Insurance Black Box," Downloaded from http://www.cnet.com/roadshow/news/researchers-hack-a-corvettes-brakes-via-insurance-black-box/, 2 pages, Aug. 2015.
Greenberg, "Hackers Remotely Kill A Jeep On The Highway—With Me In It," Downloaded from http://www.wired.com/2015/07/hack-ers-remotely-kill-jeep-highway/, 24 pages, Jul. 21, 2015.
Guardiola et al., "A Bias Correction Method for Fast Fuel-to-Air Ratio Estimation in Diesel Engines," Proceedings of the Institution of Mechanical Engineers, Part D: Journal of Automobile Engineering, vol. 227, No. 8, pp. 1099-1111, 2013.
Guardiola et al., "A Computationally Efficient Kalman Filter Based Estimator for Updating Look-Up Tables Applied to NOx Estimation in Diesel Engines," Control Engineering Practice, vol. 21, pp. 1455-1468.
Guzzella et al., "Introduction to Modeling and Control of Internal Combustion Engine Systems," 303 pages, 2004.
Hahlin, "Single Cylinder ICE Exhaust Optimization," Master's Thesis, retrieved from https://pure.ltu.se/portal/files/44015424/LTU-EX-2013-43970821.pdf, 50 pages, Feb. 1, 2014.
Hammacher Schlemmer, "The Windshield Heads Up Display," Catalog, p. 47, prior to Apr. 26, 2016.

(56) References Cited

OTHER PUBLICATIONS

Heywood, "Pollutant Formation and Control," Internal Combustion Engine Fundamentals, pp. 567-667, 1988.
Hirsch et al., "Dynamic Engine Emission Models," Automotive Model Predictive Control, Chapter 5, 18 pages, LNCIS 402, 2012.
Hirsch et al., "Grey-Box Control Oriented Emissions Models," The International Federation of Automatic Control (IFAC), Proceedings of the 17th World Congress, pp. 8514-8519, Jul. 6-11, 2008.
Hockerdal, "EKF-based Adaptation of Look-Up Tables with an Air Mass-Flow Sensor Application," Control Engineering Practice, vol. 19, 12 pages, 2011.
Http://nexceris.com/news/nextech-materials/, "NEXTECH Materials is Now NEXCERIS," 7 pages, printed Oct. 4, 2016.
Http://www.arb.ca.gov/msprog/obdprog/hdobdreg.htm, "Heavy-Duty OBD Regulations and Rulemaking," 8 pages, printed Oct. 4, 2016.
Https://www.dieselnet.com/standards/us/obd.php, "Emission Standards: USA: On-Board Diagnostics," 6 pages, printed Oct. 3, 2016.
Https://www.en.wikipedia.org/wiki/Public-key_cryptography, "Public-Key Cryptography," 14 pages, printed Feb. 26, 2016.
Ishida et al., "An Analysis of the Added Water Effect on NO Formation in D.I. Diesel Engines," SAE Technical Paper Series 941691, International Off-Highway and Power-Plant Congress and Exposition, 13 pages, Sep. 12-14, 1994.
Ishida et al., "Prediction of NOx Reduction Rate Due to Port Water Injection in a DI Diesel Engine," SAE Technical Paper Series 972961, International Fall Fuels and Lubricants Meeting and Exposition, 13 pages, Oct. 13-16, 1997.
Johansen et al., "Hardware Architecture Design for Explicit Model Predictive Control," Proceedings of ACC, 6 pages, 2006.

\* cited by examiner

ENGINE AND AFTERTREATMENT OPTIMIZATION SYSTEM

BACKGROUND

The present disclosure pertains to pollutant reduction systems and particularly to aftertreatment systems for engines.

SUMMARY

The disclosure reveals an approach and system for engine and aftertreatment system optimization. Emissions of an engine may be reduced by an aftertreatment mechanism. Control of the engine and the aftertreatment mechanism may be coordinated for the best overall efficiency relative to both fuel consumption and the emissions reduction. Engine and aftertreatment control may also be optimized in terms of cost function minimization. Individual efficiencies of the engine and aftertreatment mechanism are not necessarily significant by themselves. Therefore, the engine and aftertreatment mechanism should be controlled in a manner to achieve the optimality of the engine and the aftertreatment mechanism together as one entity.

DESCRIPTION

The emissions of modern diesel engines may be reduced by an aftertreatment system or mechanism (ATS) based on catalysts. Several different ATS systems may exist; the selective catalyst reduction based on urea injection (SCR) may be an ATS which can be used often. The state of the art control systems may control the engine and the ATS separately in an isolated fashion. However, it seems that a coordinated control may lead to the best overall efficiency from both fuel consumption and the emissions reduction points of view. A reason is that the engine out exhaust gas properties (e.g., temperature, concentrations) may affect ATS efficiency. Therefore, the idea of treating the engine and ATS optimization as a single optimization issue may be attractive.

The engine plus ATS optimal control may be described as a cost function minimization. The cost function may have a special form. It may be the sum of two terms. One term (T1) may be a function of the engine state and related to the engine fuel efficiency. Another term (T2) may be a function of both engine and ATS states, and related to the tailpipe emissions. Thus, an overall cost function may have a triangular structure. This approach may be used to reduce the issue complexity by splitting the optimization to two steps. First, using an ATS model, the optimal value of T2 may be expressed as a function of the engine state and ATS state. Then, the current ATS state may be substituted for T2 online resulting in a function of just the engine state. The optimal ATS controls may be evaluated in this step. T2 may be passed to the engine control system. Then, the engine control system may add T2 to T1. Controlling the engine with respect to T1+T2, the overall engine plus ATS performance may be optimized; both engine and ATS efficiency may be duly respected. An advantage is that the engine control system may almost be separated from the ATS control system and vice versa. The only communication necessary may be passing a set of parameters (T2 evaluated for the current ATS state) to the engine control system. The engine control system does not necessarily need to pass any information to the ATS control system. The communication may be one-directional (e.g., from an ATS control system to an engine control system). The separation may have two advantages. One is that the engine control system may be developed independently and then integrated. The engine control system and the ATS control system may easily operate on different sampling rates which is an approach that appears advantageous because the ATS system response may be slower compared to that of the engine. The present approach may be extended to cascade configurations of several different aftertreatment systems (e.g., OxyCat, DOC, SCR, DPF, LNT, and so on).

The present approach may be set forth as in the following. An optimal engine control system may allow for real-time changes of a subset of the cost function parameters related to engine out gas properties (especially temperature and engine out emissions). Second, an ATS control system may calculate an optimal ATS performance cost function value as a function of the engine state, for instance, mainly the engine out exhaust gas state. Then, the above-noted control systems implementing a real-time one-directional communication may be integrated.

When applying various aftertreatment mechanisms, such as selective catalytic reduction (SCR), lean nitrous oxides trap (LNT), discrete particulate filter (DPF), and/or diesel oxidation catalyst (DOC) to the internal combustion engines, the gaseous material may flow as a stream through a cascade of devices being generated at the first device, incorporating the engine.

The present approach may be based on the following items. First, an achievable optimality of operation for each of the devices, excluding the engine-related device, may be given by the properties of the exhaust gas in its inlet, mainly its composition and temperature. This may be justified by stating that the devices in the cascade are in fact chemical reactors where various chemical reactions take place. The reaction rates may be mainly affected by the two factors (i.e., temperature and composition). Besides the inlet properties, the devices may have control signals which can be used to affect the operation. A main scope of the present approach may be determining how the control signals can be optimized.

Second, the gas flow through the cascade may define a hierarchy of interactions. Devices operating upstream of any other device may be in a position of being the other device's master because they affect the temperature and the composition of the gas entering this device. These master devices may either improve or deteriorate the downstream efficiency. In contrast, the downstream devices may hardly affect the performance of the upstream neighbors. This appears to be a direct consequence of the one-directional causality existing in the cascade. The cascade asymmetry may be crucial for the present approach in that it makes use of a fact that cascade members do not necessarily interact with their predecessors. Such upstream interactions may be negligible.

The overall performance of the cascade may be subject of interest/optimization. The individual efficiencies of the cascade members are not necessarily important. As an example, the engine may be allowed to generate pollutants like NOx (which often means better thermal efficiency, i.e., lower fuel consumption and thus lower cost) if a downstream device can remove the pollutants through some chemical reaction. A tailpipe concentration of NOx at the end of a cascade may be important. Therefore, virtually all devices should be controlled in a coordinated manner to achieve the optimality of the whole cascade, not necessarily each device's own optimality. In the present approach, individual efficiencies may be addressed only to be able to optimize the efficiency of the whole cascade in a more convenient way. Thus, individual efficiencies are not necessarily optimized per se.

One may assume that the optimality of the cascade means that a known and defined cost function has minimum value. The present approach may make use of the fact that the overall cost function of the cascade can be expressed as a sum of terms pertaining to the individual devices. This assumption may be quite general because costs are normally considered additive. As an example, the costs related to the engine may be fuel costs, and the costs related to the SCR reactor may be urea fluid costs since the fluid is being injected in the reactor to remove the nitrous oxides from the exhaust gases. The DPF costs may be related to the cost of filter regeneration, particularly the cost of the fuel which needs to be used to burn off the soot accumulated in the DPF. The costs of reducing tailpipe concentrations of pollutants may be associated with the last downstream device. These costs may be understood as virtual costs of emissions. The costs may be represented as soft or hard constrains as given by legislative emission limits.

The present approach may use one-directionality of the causality and knowledge about the devices' individual efficiencies to achieve overall optimality sequentially in a more efficient way than might be implied by just optimizing the whole cascade simultaneously.

The present approach of upstream sequential optimization may be explained in the following. A controller (e.g., having a computer program) dedicated to each device (i.e., cascade member) may know the device's optimality index definition as a function of 1) inlet properties, 2) internal state variables and 3) control values.

Item 1) of inlet properties of the device may incorporate items such as composition and temperature. The engine may be an exception because it has no inlet in the cascade, being a source of the cascade.

Item 2) of internal state variables may incorporate items such as an accumulation of reactants, like an ammonia accumulation in the SCR reactor, a device's temperature, and so on.

Item 3) of control values may incorporate items such as urea injection rate to the SCR reactor. Control values pertaining to the engine may incorporate an exhaust gas recirculation valve opening, a variable geometry turbine aspect of ratio, fuel injection timing, valve timing, and so forth.

Then, virtually all of the dedicated controllers herein of the cascade may perform the actions in an order opposite of the flow of the gas, which is starting from the last device and approaching the engine. First, the controller of the device "n" may optimize costs of the device with respect to the device's controls for its current state, leaving the inlet gas properties as parameters of the optimal solution. The optimal solution parameterized by the inlet gas properties may be found. Then, this parametric solution may be passed upstream to the neighboring device "n-1".

Second, the controller of the next upstream device "n-1" may optimize this device's costs plus the optimality cost information received from its downstream neighbor "n". This received part may be parameterized by the inlet properties of device "n" which are the outlet properties of device "n-1". In view of this, the optimization solved at device "n-1" may remain local; it does not necessarily involve variables not pertaining to "n". When completed, the parametric solution of device "n-1" may again be passed upstream to the neighboring device "n-2". Third, the previous step may be repeated until the first cascade member is reached, which is the engine as device "1".

The optimal control signals to the devices may be derived by substituting the respective device's current inlet gas properties for the parametric solutions and applied immediately to the device.

Following the above-noted three steps may ensure that virtually all of the controls are set to positions which optimize the overall optimality index of the whole cascade although virtually always only one device is being optimized at a time. Thus, computational time may be saved without compromising the optimality.

To summarize, the main characteristics of the present approach may incorporate the following items. First, the dedicated controllers controlling the devices may be called upstream starting from the tailpipe and approaching the engine. Second, each controller may solve a parametric optimization problem with the inlet gas properties as a free undetermined parameter. Third, each controller may pass its result to its upstream neighbor which adds it to the cost function defined by the device pertaining to it. Thus, the parametric solutions passed upstream may be understood as cost function modifiers or cost function value modifiers.

Fourth, the first upstream device, which may incorporate the engine and its controller, may execute the last and determine the optimal cost function value (for the whole cascade) after its own problem is solved. The device may apply its optimal controls to the engine. Then, the engine outlet gas properties may result in a message downstream so that the downstream devices can adjust their controls to the actual state.

The message may be passed downstream in a predictive way. It means that the "n-1" controller may send the assumed outlet gas properties of its device ahead in time, including trends (e.g., a trajectory). This may represent one of more sophisticated variants of the basic paradigm. However, these details are not necessarily subject to the present approach.

Fifth, the state of the whole cascade reached in this way may be globally optimal, i.e., the total costs of the whole cascade are minimal or at a minimum. The optimality may either be virtually at all times, or just in the steady state, i.e., when not in some transient. This may depend on the implementation details.

Optimizing devices sequentially may be significantly simpler than optimizing the whole system consisting of the whole set of devices, although the optimal solutions might be regarded as the same. This may be a consequence of the simultaneous optimization problem complexity. Usually, the complexity is superliner in that the computer time required grows faster than the number of elementary devices involved in the problem. When optimizing the devices separately in a row, the problem of complexity may still be linear relative to the number of devices. Thus, serialization may make the optimization faster and more reliable numerically. Most existing efficient algorithms may in fact be based on the same paradigm of "divide et impera" (i.e., divide and conquer). That is, to solve the problem, it is divided into a sequence of simpler problems. The amount of complexity appears quite important practically because the computation power present on board, which can be dedicated to emissions control, may be limited. Even if the computational power of the onboard computers constantly increases, the emission control may be the only one of the optimization problems solved. Therefore, problem complexity reduction may be an important issue. This may be the reason why existing vehicles (as known now in 2011) do not necessarily have such optimization performed on board even though such optimization might be performed off-line by researchers.

The devices like DPF and SCR appear typically much slower than the engine. The main engine controls should be updated every 5, 10 or so milliseconds to preserve optimality. Optimizing the whole cascade periodically may mean that the complex problem is solved at this sampling rate. In contrast, the present approach may separate the sampling rates of the dedicated controllers very naturally. The DPF and SCR controller or controllers may solve the problems at a much slower sampling rate because the parametric solutions will not necessarily change noticeably in several seconds (e.g., SCR) or even minutes or more (e.g., DPF). This means that the SCR and especially the DPF optimization problems may be spread out in time. The onboard computer does not necessarily have to be as fast as it needs to be when having to solve even a more complex (e.g., a simultaneous optimization) problem each 5 ms.

Figure 1:
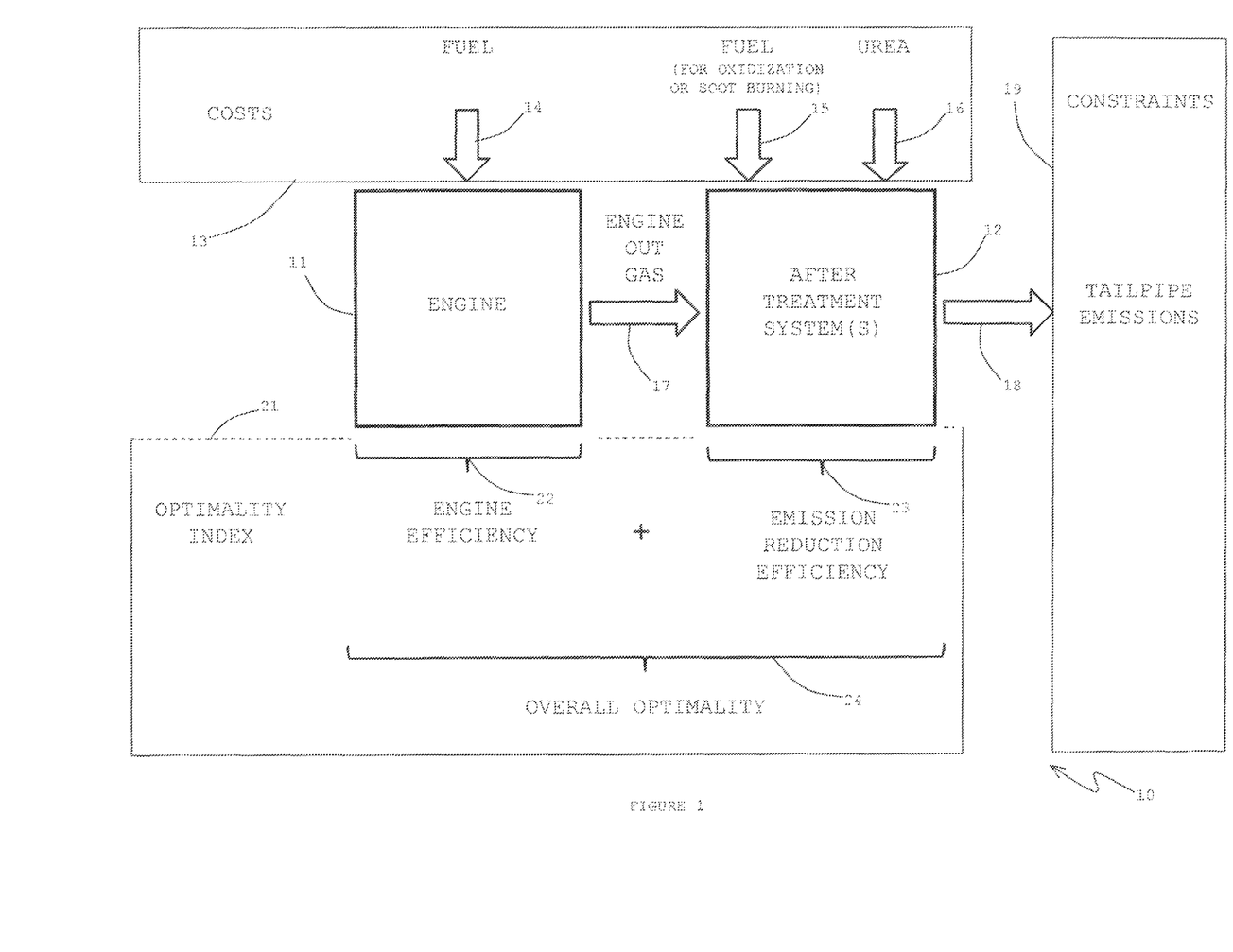
FIG. 1 is a diagram of coordinated engine and aftertreatment optimization system.
Figure 2:
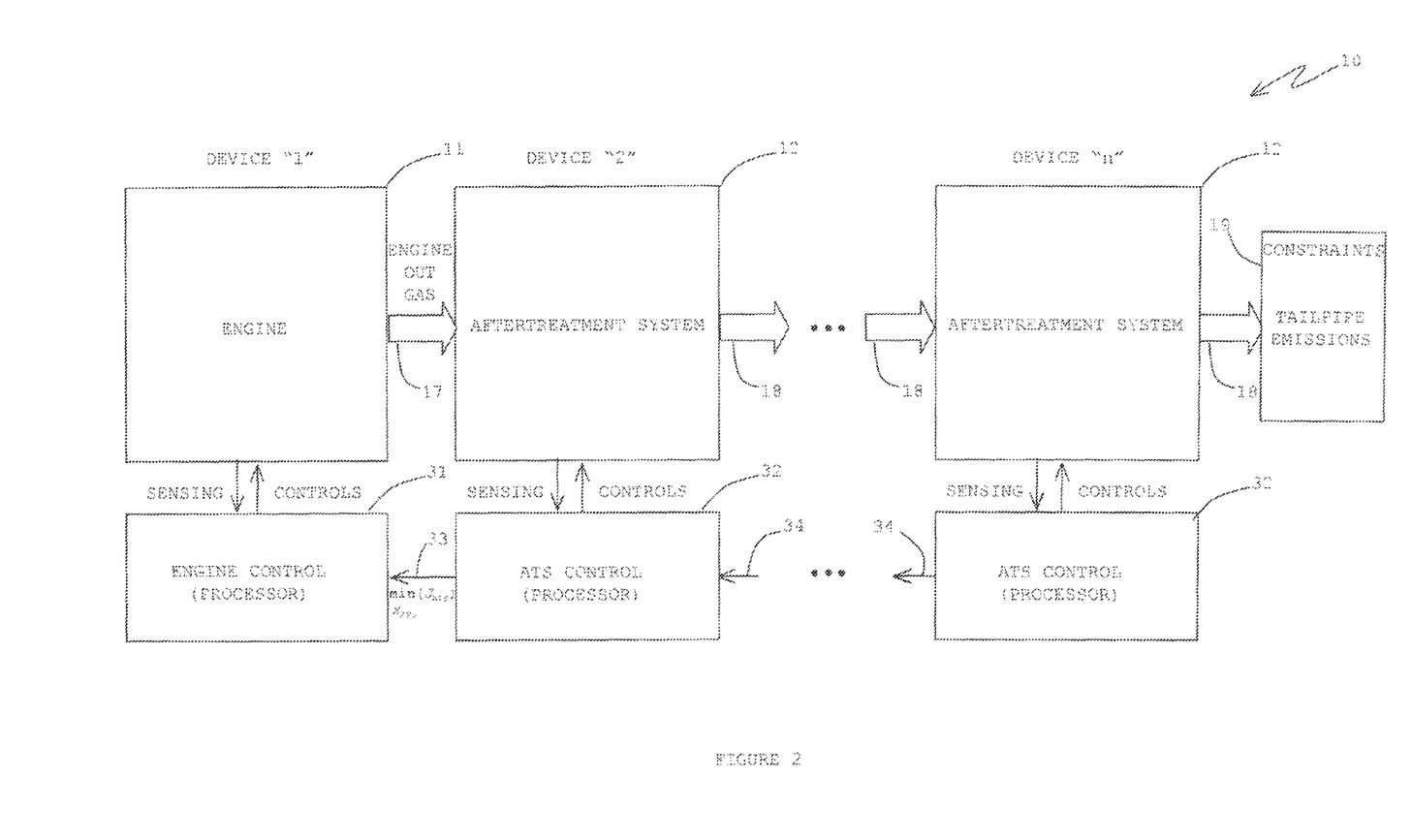
FIG. 2 is a diagram showing a control aspect of the engine and after-treatment optimization system.

An illustration of coordinated engine and after-treatment optimization may be viewed in light of an example in FIGS. 1 and 2. The two main components of the present system or approach 10 shown in FIG. 1 are an engine 11 and an aftertreatment system 12. Engine out gas 17 may go from engine 11 to aftertreatment system (ATS) 12. Tailpipe emissions 18 may exit system 12. Emissions may be subject to constraints 19. Constraints 19 may incorporate regulations on the maximum amounts of various pollutants which may be in emissions 18.

Another factor to be noted may be costs 13. Costs may incorporate a cost 14 of fuel entering engine 11, a cost 15 of fuel entering aftertreatment system 12 for oxidation or soot burning, and a cost 16 for urea entering system 12 for pollutant reduction. An optimality index 21 may be a consideration in the present approach or system 10. Engine efficiency 22 and emission reduction efficiency 23 may be determined. A sum of efficiencies 22 and 23 may indicate an overall optimality 24. Optimality index 21 of the system 10 may be deduced from overall optimality 24. Efficiencies 22 and 23 may be converted to optimality indices of engine 22 and aftertreatment system(s) 23, respectively. Then, the overall optimality 24 for system 10 or the cascade of engine 22 and aftertreatment system(s) 23 may be deduced from the optimality indices of engine 22 and aftertreatment system(s) 23.

An analysis of the present system 10 may be effected with an optimization decomposition. Assumptions may incorporate the following items: 1) Engine optimality does not necessarily depend on an aftertreatment internal state; 2) An aftertreatment optimality may depend on an engine state because the optimality depends on the properties of engine out gas 17 (aftertreatment optimality may also depend on the aftertreatment's own state); and 3) An overall cost function may be additive.

The overall cost function may be represented by the following expression.

$$J_{overall}(x_{engine}, x_{ATS}) = J_{engine}(x_{engine}) + J_{ATS}(x_{engine}, x_{ATS})$$

Using the assumptions as expressed in $$J_{overall}(x_{engine}, x_{ATS}) = J_{engine}(x_{engine}) + J_{ATS}(x_{engine}, x_{ATS})$$
and $$\min_{x_{engine}, x_{ATS}} J_{overall}(x_{engine}) = \underbrace{\min_{x_{engine}} (J_{engine}(x_{engine}) + \min_{x_{ATS}} (J_{ATS}(x_{engine}, x_{ATS})))}_{J_{modified\ engine}(x_{engine})},$$

the following statements may be noted. The overall optimality 24 may be achieved when modifying the engine subsystem optimality or efficiency index 22. The modification may be calculated by an ATS control system 32 (FIG. 2) as a by-product of the ATS control calculations.

Decomposed control may be illustrated with a diagram in FIG. 2. ATS device "n" 12 may send a message 34 upstream to the next device "n-1", and device "n-1" may send a message 34 to a next device "n-2", and device "n-2" may send a message 34 to the next device and so on until a device "2" 12 is reached with a message 34. Device "2" 12 may send an engine control system 31 a message 33

$$\left( \min_{x_{ATS}} (J_{ATS}) \right)$$

as shown at arrow 33 indicating how various "engine out gas states" impact the ATS 12 cost function optimal values. Engine control system 31 may then find an optimal compromise, which is a minimum sum of the ATS and engine cost functions. The engine control 31 and ATS control 32 may receive detection signals from sensors or other components at the engine 11 and ATS system(s) 12, respectively, and provide control signals to actuators or other components at the engine 11 and ATS system(s) 12 as appropriate for operation of system as described herein. Signals 33 and 34 to engine control or controller 31 and ATS control or controller 32 may be provided from one controller to another also as appropriate for operation of system as described herein. The controls or controllers 31 and 32 may be processors. The processors may user interfaces, storage facilities, external connections (e.g., internet), and other components for facilitating system 10.

Strictly, the impact of engine out gas states on the ATS cost should be parameterized along the engine control system prediction horizon. However, this effect is approximately constant along the engine control system prediction horizon due to different reaction speeds of the engine and ATS systems. The ATS may be slower. This fact may minimize ATS 12 to an engine communication complexity (i.e., arrow 33).

Advantages of system 10 may be noted. Overall optimality 24 may be achieved. The engine control system 31 may be developed/tested independently on the ATS control system 32 and vice versa. Engine control system 31, once developed, may be combined with different ATS systems 12. The two control systems 31 and 32 may easily operate on different sampling rates (engine 11 reacts faster than ATS 12).

Figure 3:
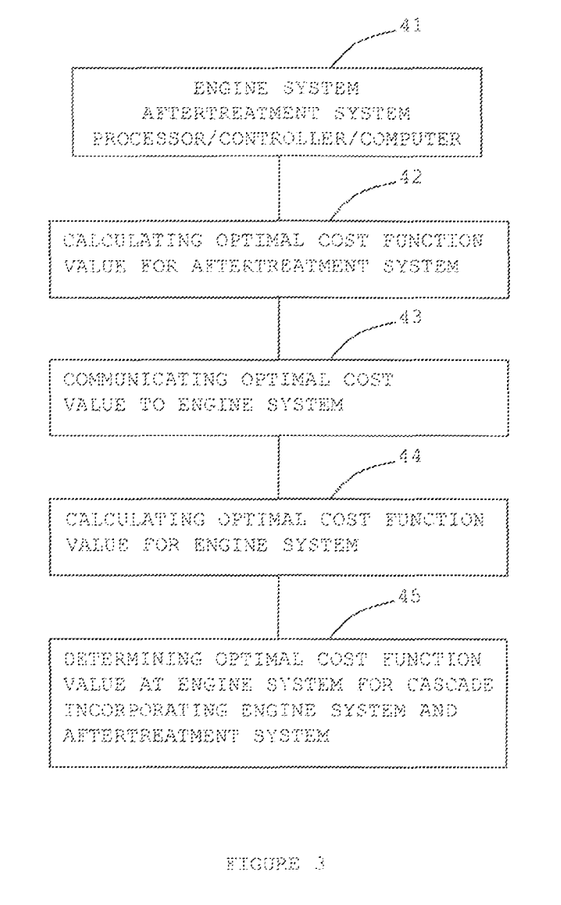
FIG. 3 is a diagram of an approach for optimization of the engine and after-treatment system.

Some of the items or activities of the disclosed system in FIGS. 1-3 not covered by one or more controllers may be performed by a processor/computer.

FIG. 3 is a diagram of an approach for optimization of a cascade incorporating an engine system and aftertreatment system. The engine system and the aftertreatment system may be eventually treated as one system or cascade. The engine system, aftertreatment system and a processor, controller or computer may be represented in symbol 41. Symbol 42 indicates that an optimal cost function value for the aftertreatment system may be calculated. The optimal cost function value for the aftertreatment system may be communicated to the engine system as indicated by symbol 43. Symbol 44 indicates that an optimal cost function value for the engine system may be calculated. At the engine system, an optimal cost function value may be determined for the cascade incorporating the engine system and the aftertreatment system, as indicated by symbol 45.

The following is a recap of the disclosure. An optimization system for an engine device and aftertreatment subsystem may incorporate an engine device and an aftertreatment subsystem. The engine device may incorporate an engine and a controller connected to the engine.

The aftertreatment subsystem may incorporate one or more aftertreatment devices. Each aftertreatment device of the one or more aftertreatment devices may have an aftertreatment mechanism and a controller connected to the aftertreatment mechanism. Each device may have an optimality index. An overall optimality index may be deduced from the optimality indices of the devices.

The optimality index of a device may be determined by inlet properties, internal state variables, and/or control values. Inlet properties may incorporate composition and temperature of an inlet gas. Internal state variables may incorporate an accumulation of reactants and temperature. Control values may incorporate one or more items of a group consisting of a urea injection rate to the aftertreatment mechanism, an exhaust gas recirculation valve opening, a variable geometry turbine aspect ratio, fuel injection timing, and value timing.

One or more aftertreatment devices operating upstream from one or more other aftertreatment devices may affect temperature, composition and other properties of the gas moving downstream to the one or more other aftertreatment devices in a one-directional causality.

An overall cost function of a cascade of the engine device and the one or more aftertreatment devices may be derived from costs for operating the devices in the cascade. The costs pertaining to the devices of the cascade may be additive. The costs may incorporate fuel, urea fluid, and other material utilized by the devices.

Each controller of an aftertreatment device of the devices may be connected to a controller of a neighboring device upstream. The controllers may communicate in a direction opposite of the direction of a flow of gas through the devices in a one-directional communication.

A cascade may have "n" devices. A controller of device "n" may optimize costs relative to controls for a current state of device "n", letting properties of inlet gas properties be parameters of an optimal solution which is found as a parametric solution. The parametric solution may be passed upstream to a controller of a neighboring device "n-1". The controller of device "n-1" may optimize costs of device "n-1" plus the parametric solution from device "n" having optimality cost information from device "n". A received solution from device "n" parameterized by the inlet properties of device "n" may be outlet properties of device "n-1". A parametric solution of device "n-1" may be passed upstream to a controller of a neighboring device "n-2". An immediate previous step may be repeated until a device "1" of the cascade receives a parametric solution of a previous neighboring device. The device "1" may be the engine.

An approach for optimization of a cascade engine system and aftertreatment system may incorporate providing an engine system having a first gas outlet, providing an aftertreatment system having a gas inlet connected to the first gas outlet and having a last gas outlet, calculating an optimal cost function value for the aftertreatment system as a function of properties of out gas from the engine system, communicating the optimal cost function value to the engine system, calculating an optimal cost function value of the engine system, and determining an optimal cost function value at the engine system for a cascade having the engine system and the aftertreatment system.

The optimal cost function value for the cascade may incorporate a minimum sum of the cost function value of the aftertreatment system and the cost function value of the engine system. The last gas outlet may provide tailpipe emissions, and the tailpipe emissions may be subject to a constraint of a predetermined maximum of pollutants.

The engine system may incorporate an engine and a controller connected to the engine. The aftertreatment system may incorporate a plurality of aftertreatment subsystems connected in series. Each aftertreatment subsystem may incorporate an aftertreatment device, and a controller connected to the aftertreatment device and to a neighboring controller upstream towards the engine system.

The approach may further incorporate determining an optimal cost function value modifier with a controller of each aftertreatment subsystem, and communicating the optimal cost function value modifier from the controller upstream to the next controller of the aftertreatment subsystem towards the engine.

An optimality of the engine system may be independent of a state of the aftertreatment system. An optimality of the aftertreatment system may be dependent on a state of the engine system. The optimalities of the engine system and the aftertreatment systems may be cost function values. The optimalities may be additive. An optimal solution may be a minimum sum of the optimalities of the aftertreatment systems and the engine system.

The approach may further incorporate passing a message via properties of a gas from the gas outlet of the engine system downstream through each of the aftertreatment systems. Each of the aftertreatment systems may adjust its controller to a state of properties of the gas.

A system for optimization of an engine and aftertreatment mechanism may incorporate an engine having a gas outlet, an aftertreatment mechanism having a gas inlet connected to the gas outlet of the engine, a first controller connected to the engine, and a second controller connected to the aftertreatment mechanism and to the first controller. The second controller may determine an optimal aftertreatment performance cost function value of the engine and provide the optimal aftertreatment performance cost function value to the first controller. The first controller may provide optimal control signals to the engine based on the optimal aftertreatment performance cost function value. The first controller may determine an optimal cost function value for the system.

The gas outlet may provide out gas having properties which contain and carry a message downstream to the aftertreatment mechanism. The second controller may make adjustments of the aftertreatment mechanism according to the message.

The engine may generate more or less pollutants to adjust fuel consumption in an out gas at the gas outlet in response to optimal control signals from the first controller based on the optimal aftertreatment performance cost function value. The aftertreatment mechanism may reduce the amount of pollutants in the out gas from the gas inlet to a predetermined level in response to control signals from the second controller. The optimal cost function value for the system may approach a minimum value.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. An optimization system for an engine device and aftertreatment subsystem comprising:
   a cascade comprising "n" devices, the "n" devices of the cascade including at least an engine device and two or more aftertreatment devices of an aftertreatment subsystem; and
   wherein:
      the engine device comprises:
         an engine; and
         an engine controller connected to the engine;
      each aftertreatment device of the two or more aftertreatment devices comprises:
         an aftertreatment mechanism; and
         an aftertreatment controller connected to the aftertreatment mechanism;
      each device has an optimality index;
      an overall optimality index is deduced from the optimality indices of the devices, wherein the engine controllers and the aftertreatment controllers of the cascade are configured to operate the engine device and aftertreatment devices to optimize the overall optimality index;
      the engine controller or the aftertreatment controller, respectively, of device "n" optimizes costs for the optimality index relative to controls for a current state of device "n", letting properties of inlet gas properties be parameters of an optimal solution which is found as a parametric solution;
      the parametric solution is passed upstream to a controller of a neighboring device "n-1";
      the controller of device "n-1" is configured to optimize costs for the optimality index of device "n-1" plus the parametric solution from device "n" having optimality cost information from device "n";
      a received solution from device "n" parameterized by the inlet properties of device "n" are outlet properties of device "n-1";
      a parametric solution of device "n-1" is passed upstream to the controller of a neighboring device "n-2";
      an immediate previous step is repeated until a device "1" of the cascade receives a parametric solution of a previously neighboring device; and
      the device "1" is the engine device.

2. The system of claim 1, wherein the optimality index of the engine device or any of the two or more aftertreatment devices is determined by one or more of inlet properties, internal state variables, and control values.

3. The system of claim 2, wherein:
   the inlet properties comprise composition and temperature of an inlet gas;
   the internal state variables comprise an accumulation of reactants and temperature; and
   the control values comprise one or more items of a group consisting of a urea injection rate to the aftertreatment mechanism, an exhaust gas recirculation valve opening, a variable geometry turbine aspect ratio, fuel injection timing, and value timing.

4. The system of claim 1, wherein one or more of the aftertreatment devices operating upstream from one or more of the other aftertreatment devices can affect temperature, composition and other properties of a gas moving downstream to the one or more other aftertreatment devices in a one-directional causality.

5. The system of claim 1, wherein an overall cost function of a cascade of the engine device and the two or more aftertreatment devices are derived from costs for operating the devices in the cascade.

6. The system of claim 5, wherein the costs pertaining to the devices of the cascade are additive.

7. The system of claim 6, wherein the costs comprise fuel, urea fluid, and other material utilized by the devices.

8. The system of claim 1, wherein:
   each aftertreatment controller of each of the aftertreatment devices is connected to a controller of a neighboring engine device or aftertreatment device upstream; and
   the aftertreatment controllers communicate in a direction opposite of the direction of a flow of gas through the devices in a one-directional communication.

9. A method for optimization of a cascade engine system and aftertreatment system, comprising:
   providing an engine system having a first gas outlet;
   providing an aftertreatment system having a gas inlet connected to the first gas outlet, and having a last gas outlet;
   calculating an aftertreatment system optimal cost function value for the aftertreatment system as a function of properties of out gas from the engine system, wherein calculating the aftertreatment system optimal cost function value comprises:
      determining an optimal cost function value modifier with the aftertreatment controller of each of a plurality of aftertreatment subsystems of the aftertreatment system; and
      communicating the optimal cost function value modifier from one of the aftertreatment subsystems to the next upstream aftertreatment subsystem for use in determining an optimal cost function value modifier for that next upstream aftertreatment subsystem;
   communicating the aftertreatment system optimal cost function value to the engine system;
   calculating an engine system optimal cost function value of the engine system;
   determining a cascade optimal cost function value at the engine system for a cascade comprising the engine system and the aftertreatment system;
   applying optimal control settings to the engine system to operate the engine system and aftertreatment system according to the determined cascade optimal cost function value; and
   wherein the calculating is effected with one or more processors in communication with one or more of the engine system and the aftertreatment system.

10. The method of claim 9, wherein the optimal cost function value for the cascade comprises a minimum sum of the cost function value of the aftertreatment system and the cost function value of the engine system.

11. The method of claim 9, wherein:
   the last gas outlet provides tailpipe emissions; and the tailpipe emissions are subject to a constraint of a predetermined maximum of pollutants.

12. The method of claim 9, wherein:
the engine system comprises:
an engine; and
an engine controller connected to the engine;
the plurality of aftertreatment subsystems are connected in series; and
each aftertreatment subsystem comprises:
an aftertreatment device; and
an aftertreatment controller connected to the aftertreatment device and to a neighboring controller upstream towards the engine system.

13. The method of claim 9, wherein:
an optimality of the engine system is independent of a state of the aftertreatment system;
an optimality of the aftertreatment system is dependent on a state of the engine system;
the optimalities of the engine system and the aftertreatment systems are cost function values;
the optimalities are additive; and
an optimal solution is a minimum sum of the optimalities of the aftertreatment systems and the engine system.

14. The method of claim 13, further comprising:
passing a message via properties of a gas from the gas outlet of the engine system downstream through each of the aftertreatment systems; and
wherein each of the aftertreatment systems adjusts its controller to a state of properties of the gas.

15. A system for optimization of an engine and aftertreatment system, comprising:
an engine having a gas outlet;
an aftertreatment system having a gas inlet connected to the gas outlet of the engine, the aftertreatment system comprising a plurality of aftertreatment subsystems each having a subsystem controller;
a first controller connected to the engine; and
a second controller connected to the aftertreatment system and to the first controller; and
wherein:
the second controller is configured to determine an optimal aftertreatment performance cost function value of the engine and provides the optimal aftertreatment performance cost function value to the first controller, wherein determining the optimal aftertreatment performance cost function value comprises:
a subsystem controller of a first aftertreatment subsystem determining an aftertreatment performance cost function value for the first aftertreatment subsystem and communicating the determined aftertreatment performance cost function value for the first aftertreatment subsystem to a subsystem controller of a second aftertreatment subsystem upstream of the first aftertreatment subsystem for use in determining an aftertreatment performance cost function value for the second aftertreatment subsystem; and
the first controller provides optimal control signals to the engine to operate the engine and aftertreatment system based on the optimal aftertreatment performance cost function value.

16. The system of claim 15, wherein the first controller determines an optimal cost function value for the system.

17. The system of claim 16, wherein:
the gas outlet provides out gas having properties which contain and carry a message downstream to the aftertreatment system; and
the second controller makes adjustments of the aftertreatment system according to the message.

18. The system of claim 16, wherein:
the engine generates more or less pollutants to adjust fuel consumption in an out gas at the gas outlet in response to optimal control signals from the first controller based on the optimal aftertreatment performance cost function value;
the aftertreatment system reduces the amount of pollutants in the out gas from the gas inlet to a predetermined level in response to control signals from the second controller; and
the optimal cost function value for the system approaches a minimum value.

* * * * *